(12) United States Patent
Kalsi et al.

(10) Patent No.: US 7,423,356 B2
(45) Date of Patent: Sep. 9, 2008

(54) THERMALLY-CONDUCTIVE STATOR SUPPORT STRUCTURE

(75) Inventors: Swarn S. Kalsi, Shrewsbury, MA (US); Peter M. Winn, Shrewsbury, MA (US)

(73) Assignee: American Superconductor Corporation, Devens, MA (US)

( * ) Notice: Subject to any disclaimer, the term of this patent is extended or adjusted under 35 U.S.C. 154(b) by 0 days.

(21) Appl. No.: 11/742,083

(22) Filed: Apr. 30, 2007

(65) Prior Publication Data

US 2007/0200440 A1   Aug. 30, 2007

Related U.S. Application Data

(63) Continuation of application No. 10/083,927, filed on Feb. 27, 2002, now Pat. No. 7,211,919, which is a continuation-in-part of application No. 09/639,218, filed on Aug. 15, 2000, now abandoned.

(60) Provisional application No. 60/149,129, filed on Aug. 16, 1999.

(51) Int. Cl.
*H02K 9/00* (2006.01)
*H02K 3/24* (2006.01)
*H02K 55/00* (2006.01)

(52) U.S. Cl. .................. 310/52; 310/214; 310/216; 310/54; 310/254

(58) Field of Classification Search ............. 310/216, 310/214, 52, 54, 64, 194, 208, 254
See application file for complete search history.

(56) References Cited

U.S. PATENT DOCUMENTS

| 1,761,387 | A | 6/1930 | Gay | 310/52 |
|---|---|---|---|---|
| 1,959,527 | A | 5/1934 | Ehrmann | 310/54 |
| 2,844,745 | A | 7/1958 | Hamm | 310/57 |
| 3,049,634 | A | 8/1962 | Horsley | 310/54 |
| 3,184,624 | A | 5/1965 | Henry | 310/54 |
| 3,469,126 | A | 9/1969 | Eugen | 310/54 |
| 3,681,628 | A | 8/1972 | Krastschew | 310/54 |
| 3,801,843 | A | 4/1974 | Corman et al. | 310/52 |
| 3,963,950 | A | 6/1976 | Watanabe et al. | 310/54 |
| 4,123,676 | A | 10/1978 | Cooper et al. | 310/52 |
| 4,126,798 | A | 11/1978 | Carr, Jr. et al. | 310/204 |
| 4,128,805 | A | 12/1978 | Lanz | 324/52 |

(Continued)

FOREIGN PATENT DOCUMENTS

GB   739896   11/1955

(Continued)

OTHER PUBLICATIONS

"Electric Motors", Anderson and Miller, pp. 24-27, Aug. 1986.

*Primary Examiner*—Karl I Tamai
(74) *Attorney, Agent, or Firm*—Occhiuti Rohlicek & Tsao LLP

(57) ABSTRACT

A stator assembly including a plurality of stator coil assemblies and a stator coil support structure constructed of a non-magnetic, thermally-conductive material. The stator coil support structure includes an axial passage for receiving a rotor assembly and a plurality of channels positioned radially about the axial passage. Each channel is configured to receive one or more of the stator coil assemblies.

18 Claims, 16 Drawing Sheets

U.S. PATENT DOCUMENTS

| | | | | |
|---|---|---|---|---|
| 4,179,635 | A | 12/1979 | Beerman | 310/214 |
| 4,228,375 | A | 10/1980 | Beerman et al. | 310/214 |
| 4,328,551 | A | 5/1982 | Yamamura et al. | 364/492 |
| 4,330,726 | A | 5/1982 | Albright et al. | 310/254 |
| 4,352,034 | A | 9/1982 | Karhan et al. | 310/59 |
| 4,356,419 | A | 10/1982 | Boer et al. | 310/217 |
| 4,385,248 | A | 5/1983 | Laskaris | 310/52 |
| 4,427,907 | A | 1/1984 | Flick et al. | 65/3 R |
| 4,709,180 | A | 11/1987 | Denk | 310/179 |
| 4,797,588 | A | 1/1989 | Capion | 310/54 |
| 5,053,663 | A | 10/1991 | Boer et al. | 310/91 |
| 5,091,666 | A | 2/1992 | Jarczynski | 310/54 |
| 5,397,953 | A | 3/1995 | Cho | 310/254 |
| 5,610,501 | A | 3/1997 | Nelson et al. | 323/207 |
| 5,632,157 | A | 5/1997 | Sekino et al. | 62/244 |
| 5,672,921 | A | 9/1997 | Herd et al. | 310/52 |
| 5,731,643 | A | 3/1998 | Avakian et al. | 310/53 |
| 5,777,420 | A | 7/1998 | Gamble et al. | 310/261 |
| 5,808,387 | A | 9/1998 | Akachi et al. | 310/54 |
| 5,863,467 | A | 1/1999 | Mariner et al. | 252/511 |
| 5,866,959 | A * | 2/1999 | Le Flem | 310/51 |
| 5,886,444 | A | 3/1999 | Enomoto et al. | 310/208 |
| 5,936,502 | A | 8/1999 | Englund et al. | 335/299 |
| 6,157,109 | A | 12/2000 | Schiferl et al. | 310/254 |
| 6,313,556 | B1 | 11/2001 | Dombrovski et al. | 310/91 |
| 6,879,081 | B1 | 4/2005 | Howard et al. | |
| 7,211,919 | B2 * | 5/2007 | Kalsi et al. | 310/216 |
| 2001/0035692 | A1 | 11/2001 | Ong et al. | 310/254 |
| 2003/0052568 | A1 | 3/2003 | Howard | |
| 2004/0021391 | A1 | 2/2004 | Jones et al. | |
| 2007/0200440 | A1 * | 8/2007 | Kalsi et al. | 310/54 |

FOREIGN PATENT DOCUMENTS

| | | | |
|---|---|---|---|
| JP | 50-66708 | | 6/1975 |
| JP | 59-089568 | * | 5/1984 |
| JP | 59-106871 | * | 5/1984 |
| JP | 62-196683 | | 8/1987 |
| JP | 06-327231 | * | 11/1994 |
| JP | 7-23540 | | 1/1995 |
| JP | 09046975 | | 2/1997 |
| JP | 2003 070197 | | 3/2003 |
| WO | WO01/13496 A1 | | 2/2001 |
| WO | WO 01/41283 | | 6/2001 |
| WO | WO 01/51863 | | 7/2001 |
| WO | WO 01/52276 | | 7/2001 |
| WO | WO 01/52383 | | 7/2001 |
| WO | WO 01/52391 | | 7/2001 |
| WO | WO 01/52392 | | 7/2001 |
| WO | WO 01/58005 | | 8/2001 |
| WO | WO 02/13360 | | 2/2002 |
| WO | WO 02/13361 | | 2/2002 |
| WO | WO02/073584 | | 9/2002 |
| WO | WO 03/007462 | | 1/2003 |
| WO | WO 2004/017500 | | 2/2004 |

* cited by examiner

THERMALLY-CONDUCTIVE STATOR SUPPORT STRUCTURE

RELATED APPLICATIONS

This application is a continuation of application Ser. No. 10/083,927, filed Feb. 27, 2002, which is a continuation-in-part (and claims the benefit of priority under 35 U.S.C. 120) of U.S. application Ser. No. 09/639,218, filed Aug. 15, 2000, which is a conversion of U.S. provisional application Ser. No. 60/149,129, filed Aug. 16, 1999. The disclosure of the prior application is considered part of (and is incorporated by reference in) the disclosure of this application.

The following applications are hereby incorporated by referenced into the subject application as if set forth herein in full: (1) U.S. Application Ser. No. 09/632,599, filed Aug. 4, 2000, entitled "Superconducting Synchronous Machine Field Winding Protection"; (2) U.S. application Ser. No. 09/632,602, filed Aug. 4, 2000, entitled "Segmented Rotor Assembly For Superconducting Rotating Machines"; (3) U.S. application Ser. No. 09/632,600, filed Aug. 4, 2000, entitled "Exciter For Superconducting Rotating Machinery"; (4) U.S. application Ser. No. 09/632,601, filed Aug. 4, 2000, entitled "Stator Support Assembly For Superconducting Rotating Machines"; (5) U.S. application Ser. No. 09/480,430, filed Jan. 11, 2000, entitled "Exciter and Electronic Regulator for Rotating Machinery"; (6) U.S. application Ser. No. 09/481,480, filed Jan. 11, 2000, entitled "Internal Support for Superconducting Wires"; (7) U.S. Ser. No. 09/480,396, filed Jan. 11, 2000, entitled "Cooling System for HTS Machines"; (8) U.S. application Ser. No. 09/415,626, filed Oct. 12, 1999, entitled "Superconducting Rotating Machine"; (9) U.S. Application No. 60/266,319, filed Jan. 11, 2000, entitled "HTS Superconducting Rotating Machine"; (10) U.S. application Ser. No. 09/905,611, filed Jul. 13, 2001, entitled "Enhancement of Stator Leakage Inductance in Air-Core Machines"; (11) U.S. application Ser. No. 09/956,328, filed Sep. 19, 2001, entitled "Axially-Expandable EM Shield"; and (12) U.S. application Ser. No. 09/480,397, filed Jan. 11, 2000, entitled "Stator Construction For Superconducting Rotating Machines".

TECHNICAL FIELD

This invention relates to rotating machines.

BACKGROUND

Superconducting air-core, synchronous electric machines have been under development since the early 1960's. The use of superconducting windings in these machines has resulted in a significant increase in the field electromotive forces generated by the windings and increased flux and power densities of the machines.

Early superconducting machines included field windings wound with low temperature superconductor (LTS) materials, such as NbZr or NbTi and later with $Nb_3Sn$. The field windings were cooled with liquid helium from a stationary liquifier. The liquid helium was transferred into the rotor of the machine and then vaporized to use both the latent and sensible heat of the fluid to cool the windings. This approach proved to be viable for only very large synchronous machines. With the advent of high temperature superconductor (HTS) materials in the 1980's, the cooling requirements of these machines were greatly reduced and smaller superconducting machines were realizable.

In addition to the heat generated by the rotor assembly, the stator assembly also generates a considerable amount of heat that must be removed in order for the superconducting machine to operate efficiently. In conventional "non-superconducting" rotating machines, iron teeth are utilized between the individual stator coil assemblies, which act as heat sinks and remove the heat generated by the stator assembly. However, in superconducting machines, the flux density is so great between these stator coil assemblies that these iron teeth would immediately become saturated, resulting in Eddy current heating and operating inefficiency.

SUMMARY

According to an aspect of this invention, a stator assembly includes a plurality of stator coil assemblies and a stator coil support structure constructed of a non-magnetic, thermally-conductive material. The stator coil support structure includes an axial passage for receiving a rotor assembly, and a plurality of channels positioned radially about the axial passage. Each channel is configured to receive one or more of the stator coil assemblies.

One or more of the following features may also be included. Each stator coil assembly is surrounded by a ground plane assembly. The stator assembly further includes a magnetic annular assembly surrounding the stator coil support structure. The magnetic annular assembly includes a plurality of axial coolant passages. The stator assembly further includes a coolant circulation system for circulating a cooling liquid through the axial coolant passages. The non-magnetic, thermally conductive material is a sheet material which is laminated to form the stator coil support structure. The sheet material is an advanced thermal transfer adhesive. The sheet material is Grafoil. The stator assembly further includes an epoxy filler which fills any voids between the stator coil assemblies and the stator coil support structure.

According to a further aspect of this invention, a superconducting rotating machine includes a stator assembly having a plurality of stator coil assemblies, and a stator coil support structure constructed of a non-magnetic, thermally-conductive material. The stator coil support structure includes an axial passage for receiving a rotor assembly, and a plurality of channels positioned radially about the axial passage. Each channel is configured to receive one or more of the stator coil assemblies. A rotor assembly is configured to rotate within the stator assembly. The rotor assembly includes an axial shaft and at least one superconducting rotor winding assembly.

One or more of the following features may also be included. Each stator coil assembly is surrounded by a ground plane assembly. The stator assembly further includes a magnetic annular assembly surrounding the stator coil support structure. The magnetic annular assembly includes a plurality of axial coolant passages. The superconducting rotating machine further includes a coolant circulation system for circulating a cooling liquid through the axial coolant passages. The non-magnetic, thermally conductive material is a sheet material which is laminated to form the stator coil support structure. The sheet material is an advanced thermal transfer adhesive. The sheet material is Grafoil. The superconducting rotating machine further includes an epoxy filler which fills any voids between the stator coil assemblies and the stator coil support structure. The at least one superconducting rotor winding assembly is constructed using a high-temperature superconducting material. The high temperature superconducting material is chosen from the group consisting of: thallium-barium-calcium-copper-oxide; bismuth-strontium-calcium-copper-oxide; mercury-barium-calcium-copper-oxide; and yttrium-barium-copper-oxide. The superconducting rotating machine further includes a refrigeration system for cooling the at least one superconducting rotor winding assembly.

According to a further aspect of this invention, a method of manufacturing a stator coil support structure includes forming a non-magnetic, thermally conductive cylindrical structure and forming a plurality of axial channels radially about the non-magnetic, thermally conductive cylindrical structure. The method positions one or more stator coil assemblies in each of the channels.

One or more of the following features may also be included. Forming a non-magnetic, thermally conductive cylindrical structure includes laminating multiple layers of a non-magnetic, thermally conductive sheet material to form the non-magnetic, thermally conductive cylindrical structure. Forming a non-magnetic, thermally conductive cylindrical structure includes casting a non-magnetic, thermally conductive material to form the non-magnetic, thermally conductive cylindrical structure. A plurality of axial coolant passages are provided in the non-magnetic, thermally conductive cylindrical structure. An epoxy filler is deposited between the stator coil assemblies and the non-magnetic, thermally conductive cylindrical structure.

According to a further aspect of this invention, a method of manufacturing a stator coil support structure includes forming a non-magnetic, thermally conductive cylindrical structure and forming a plurality of axial slots radially about the non-magnetic, thermally conductive cylindrical structure. The method inserts into each axial slot a heat-sinking member, thus forming a channel between each pair of adjacent heating-sinking members. The method positions one or more of the stator coil assemblies in each of the channels.

One or more of the following features may also be included. Forming a non-magnetic, thermally conductive cylindrical structure includes laminating multiple layers of a non-magnetic, thermally conductive sheet material to form the non-magnetic, thermally conductive cylindrical structure. Forming a non-magnetic, thermally conductive cylindrical structure includes casting a non-magnetic, thermally conductive material to form the non-magnetic, thermally conductive cylindrical structure. A plurality of axial coolant passages are provided in the non-magnetic, thermally conductive cylindrical structure. An epoxy filler is deposited between the stator coil assemblies and the non-magnetic, thermally conductive cylindrical structure.

According to a further aspect of this invention, a stator assembly includes a plurality of stator coil assemblies, a magnetic annular assembly, and a plurality of non-magnetic, thermally-conductive heat sinking members positioned radially about the magnetic annular assembly. This forms a plurality of channels, each configured to receive one or more of the stator coil assemblies.

One or more of the following features may also be included. The magnetic annular assembly includes a plurality of axial coolant passages. A coolant circulation system circulates a cooling liquid through the axial coolant passages. The non-magnetic, thermally-conductive heat sinking members are constructed of a non-magnetic, thermally conductive sheet material. The sheet material is laminated to form the non-magnetic, thermally-conductive heat sinking members. The sheet material is a polymer-based adhesive or a graphite-based material. The stator assembly further includes an epoxy filler disposed between the stator coil assemblies and the non-magnetic, thermally-conductive heat sinking members.

According to a further aspect of this invention, a method of manufacturing a stator coil support structure includes forming a magnetic annular assembly and forming a plurality of non-magnetic, thermally-conductive heat sinking members. The heat-sinking members are positioned radially about the magnetic annular assembly. This forms a channel between each pair of adjacent heating-sinking members. One or more stator coil assembly are positioned in each of these channels.

One or more of the following features may also be included. Forming a plurality of non-magnetic, thermally conductive heat-sinking members includes laminating multiple layers of a non-magnetic, thermally conductive sheet material, or casting a non-magnetic, thermally conductive material, to form the non-magnetic, thermally conductive heat-sinking members. The method further includes providing a plurality of axial coolant passages in the magnetic annular assembly and depositing an epoxy filler between the stator coil assemblies and the non-magnetic, thermally conductive heat-sinking members.

One or more advantages can be provided from the above aspects of the invention. Stator coil assemblies can be positioned proximate thermally-conductive heat sinks. Accordingly, the stator coil assemblies and the stator itself can operate at lower temperatures. As these heat sinks are constructed of a non-magnetic material, heat sink flux saturation is eliminated. This elimination of flux saturation minimizes Eddy current stator heating which causes stator inefficiencies. Stator heating can further be reduced by incorporating a circulation system which circulates a cooling fluid through the stator coil support structure.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
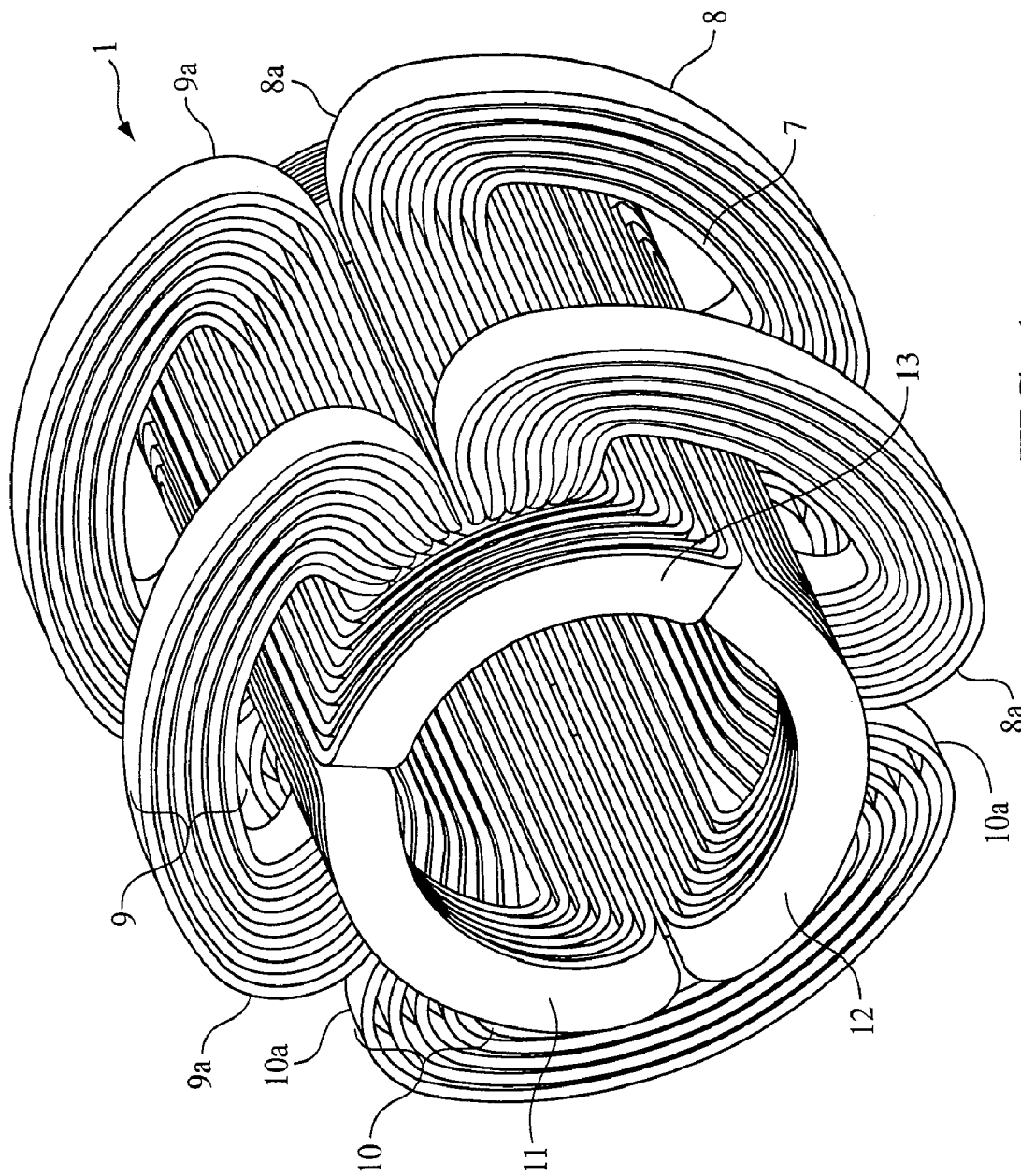
FIG. 1 is a perspective view of a single layer, three-phase stator having coil windings.

Referring to FIG. 1, a three-phase stator 1 includes multiple phase coil assemblies 8-13, which are arranged into an inner layer of phase coil assemblies 11, 12, 13 and an outer layer of phase coil assemblies 8, 9, 10. The outer layer coil assemblies 8, 9, 10 have end regions 8a, 9a, 10a which extend away from corresponding end regions of adjacent inner phase coils. Each phase coil assembly includes concentric coil windings 7 which are insulated from each other. Note that end regions 8a, 9a, 10a of the outer layer coil assembly 8, 9, 10 are exaggerated in FIG. 1 and are not normally perpendicular to the stator central axis (see FIG. 3). As will be described in greater detail below, the invention is directed to cooling systems which minimize exposure of coolant, here water to the high voltages within the stator coils, thereby allowing the use of fresh water, which contains ions.

Individual phase coil windings are made from any electrically conductive material, e.g., copper and aluminum. Typically, the phase coils are made from copper. Phase coil assemblies can be constructed using different methods.

In the embodiment shown in FIG. 1, for example, each phase coil assembly includes many concentric individually insulated coil windings. Typically, each phase coil assembly can include any number of concentric coil windings depending upon the stator motor design. Additionally, each concentric coil winding can include individually insulated coils assembled together to form the concentric coil winding. The individual coils can be insulated to withstand coil-to-coil voltage and assembled to form the concentric coil winding. Each concentric coil windings is then assembled to form a phase coil assembly, which is insulated to full phase-phase and phase-ground voltage levels.

In another method, a conductor is concentrically wound with adequate turn-to-turn insulation to form a phase coil assembly. Completed phase coil assemblies are insulated to full phase-phase and phase-ground voltage levels. In order to reduce eddy-current losses in these coils, it is generally desirable that any fully transposed Litz-type cable be employed. In certain applications, a Rutherford type conductor is employed. A Rutherford type conductor includes many smaller strands, which are fully transposed to decouple an AC field experienced by a conductor in any orientation. Rutherford conductors are also flexible making the task of coil fabrication easier. All phase coil assemblies are insulated to industry acceptable insulation classes (such as class H and F insulations), which normally dictate the highest temperature that the conductor could be operated at. Likewise, Rutherford type conductors are readily available from a number of vendors such as New England Electric Wire, Lisbon, New Hampshire.

Figure 2:
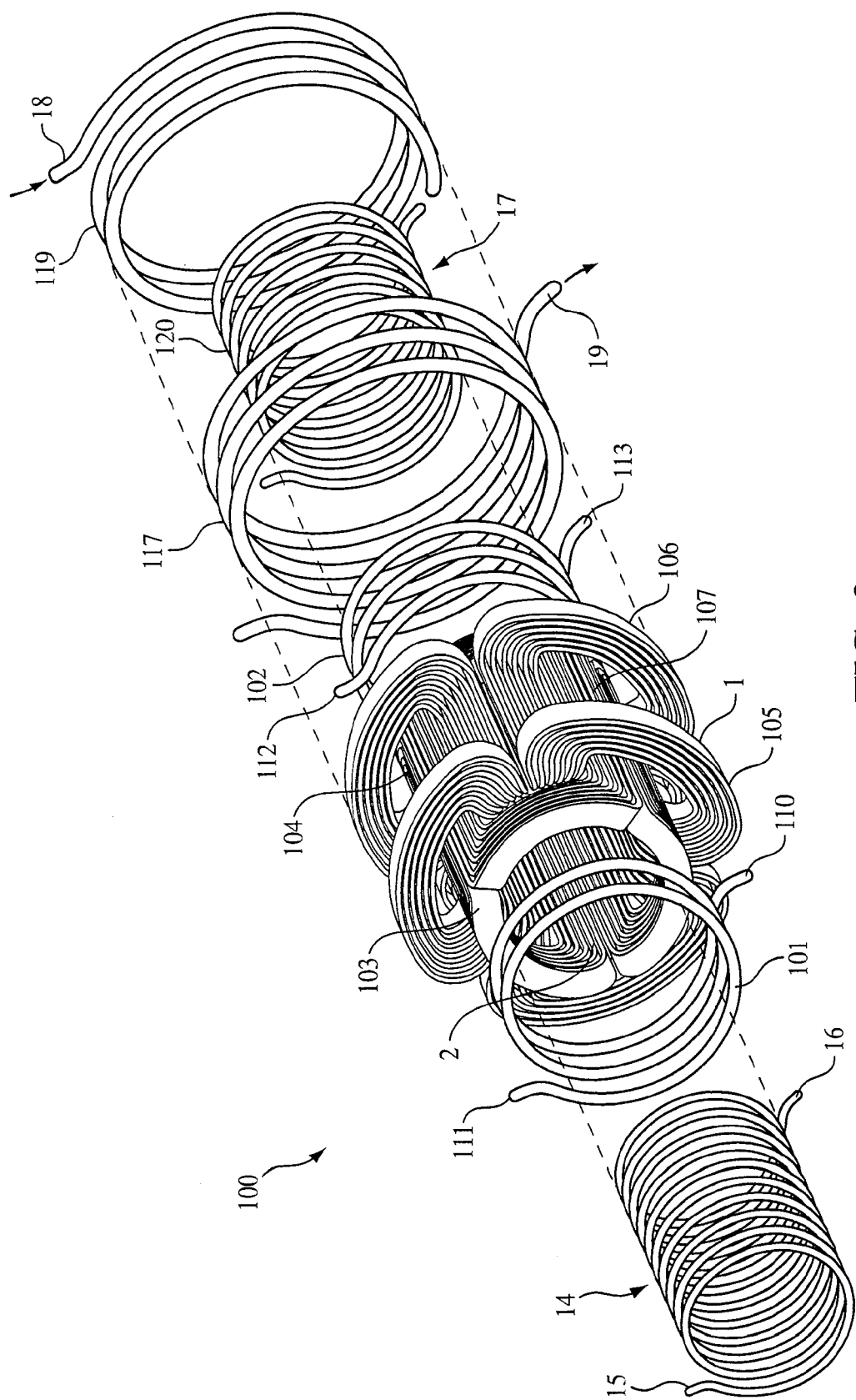
FIG. 2 is an exploded perspective view of the stator of FIG. 1 including external helical cooling tubes.

Referring to FIG. 2, a cooled stator system 100 includes a stator inner coil 14 received within a central bore 2 of the stator, an outer coil 17 wrapped about the outer surface of stator 1, and end coils 101, 102 wrapped about ends 103, 104 of the stator. Outer coil 17 includes end portions 117, 119 which surround outer layers 105, 106 of phase coil assemblies 8, 9, 10 and a central portion 120 which surrounds a midsection 107 of the inner layer of all phase coil assemblies 8-13. Each of inner coil 14, outer coil 17, and end coils 101, 102 is in fluid communication with inlets, 15, 18, 110, 112 and outlets 16, 19, 111, 113, respectively.

Figure 3A:
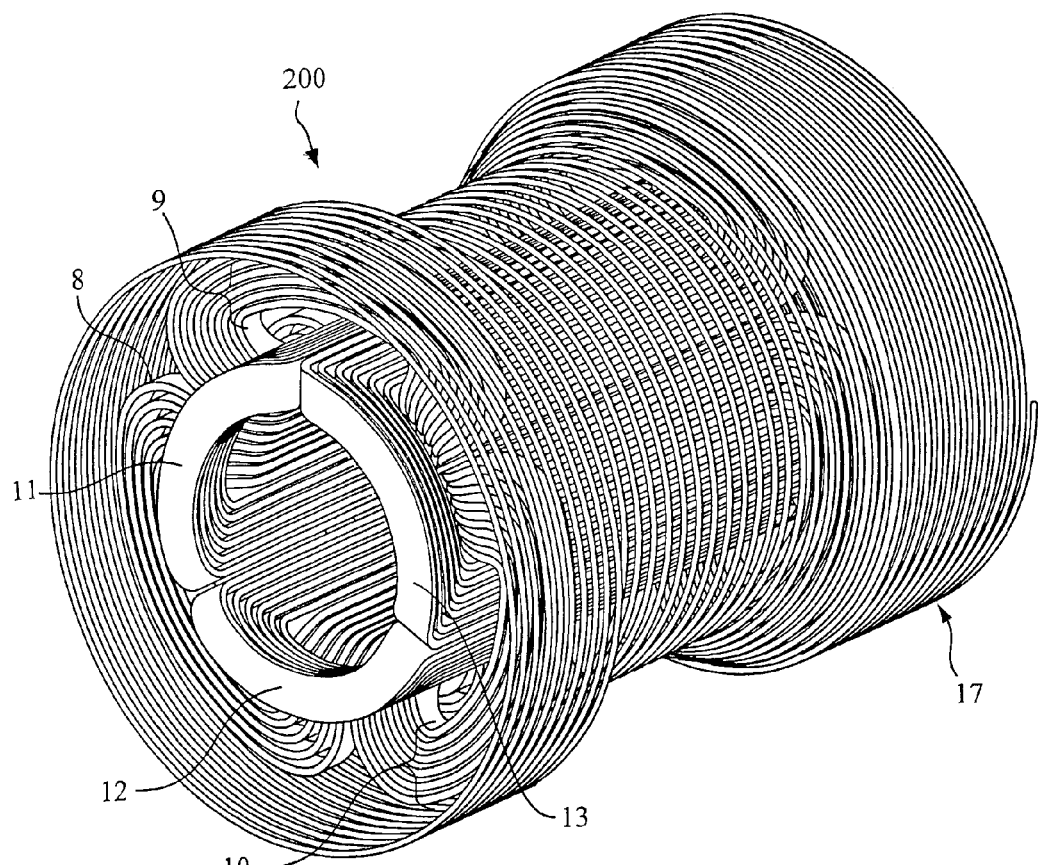
FIG. 3A is a partial assembly of stator coils with cooling tubes.
Figure 3:
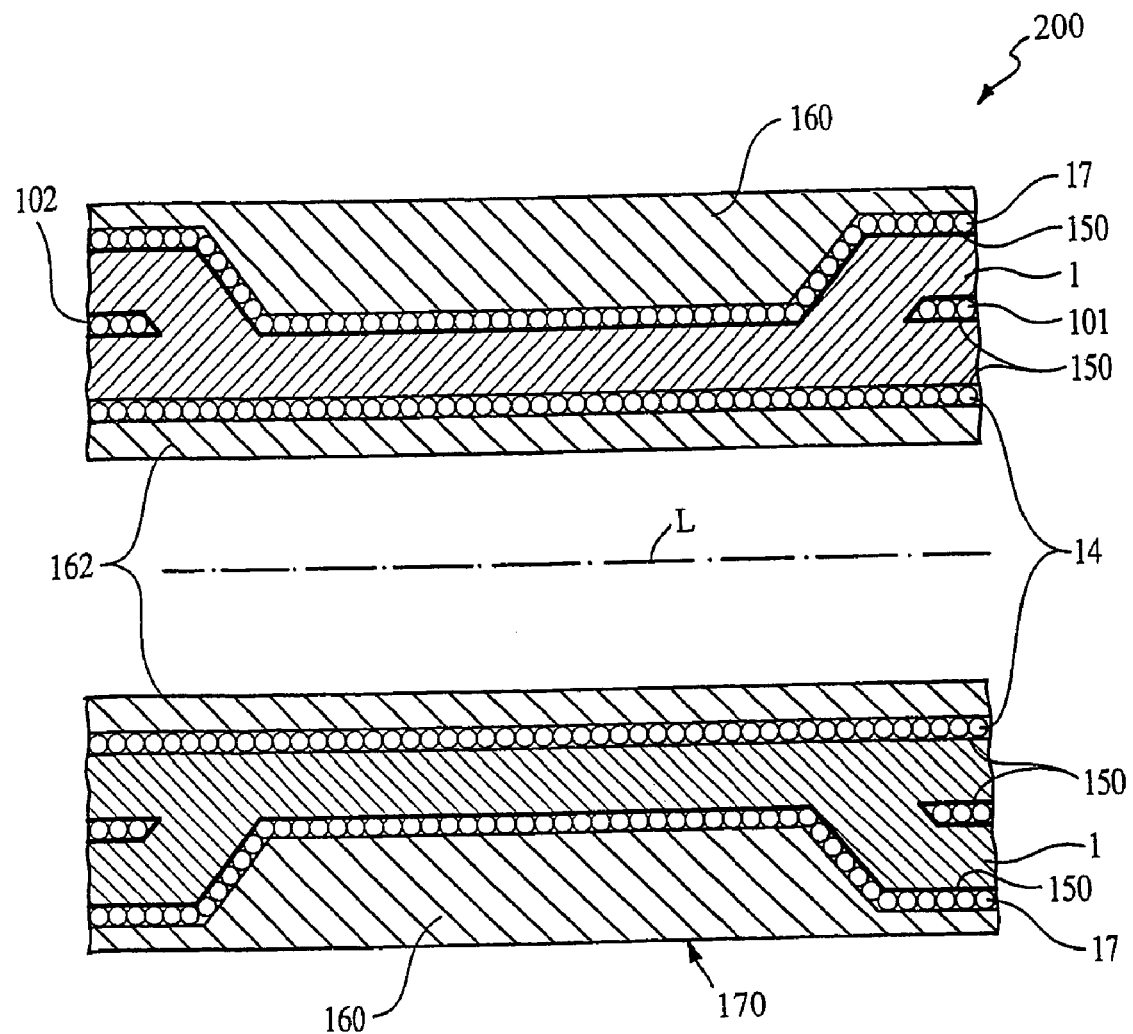
FIG. 3 is a cross-sectional schematic representation of the stator and the cooling tubes of FIG. 2.

As shown in FIG. 3, a cooled stator system 200 includes a phase coil 1 wrapped around a non-metallic bore tube 162 having an axis L. Cooling tubes 14, 101, 102 and 17 are applied to phase coil 1 and encased in core 160. Core 160, typically, is an iron core constructed from 0.02 inch thick iron laminations, e.g., those used by the motor industry. The laminations are cut in circular segments and assembled around the stator assembly 200. Alternatively, core 160 is formed by winding an iron wire of high permeability. Core 160 is insulated by a varnish or oxide for eliminating eddy-current heating. Sufficient layers of this wire could be applied to produce a smooth cylindrical outer surface 170 shown in FIG. 3.

Cooled stator system 200 is inserted inside a motor housing. The entire assembly, including stator and motor housing, are impregnated with an epoxy to bond all components of the stator together to produce a monolithic structure. Inner coil 14 is supported within stator 1 by bore tube 162. Inner coil 14, outer coil 17, and end coils 101, 102 are electrically insulated from stator 1 by an insulator 150. Insulator 150 maintains coils 14, 17, 101, 102 at a ground potential permitting the use of fresh water, which contains ions. Insulator 150 is made from any insulating material that can withstand operating voltages and the beat generated by stator 1. In general, insulator 150 has a thickness to withstand the operating voltage. The thickness of insulator 150 is determined by the dielectric strength (insulating properties) of the material. For example, the thickness of a high dielectric strength insulating material can be less than the thickness of a low dielectric strength insulating material. Typically, insulator 150 has a thickness between about 0.001 to 0.100 inches. Examples of insulative materials include, but are not limited to, epoxy, mica, and glass.

In operation, heat is transferred from the stator conductors through insulator 150 and into coils 14, 17, 101, 102, which contain cooled fresh water. By having a higher fluid pressure at inlets 15, 18, 110, 112 than at outlets 16, 19, 111, 113 cold fluid is forced to flow through coils 14, 17, 101, 102. Thus, heat transferred to the fresh water is removed from the cooled stator system. To improve cooling of stator 1, inner coil 14 removes heat from the inside while the other outer coil 17, and end coils 101, 102 remove heat from the outside. FIG. 3A shows phase coils 8-13 surrounded by cooled tube 17.

Figure 4:
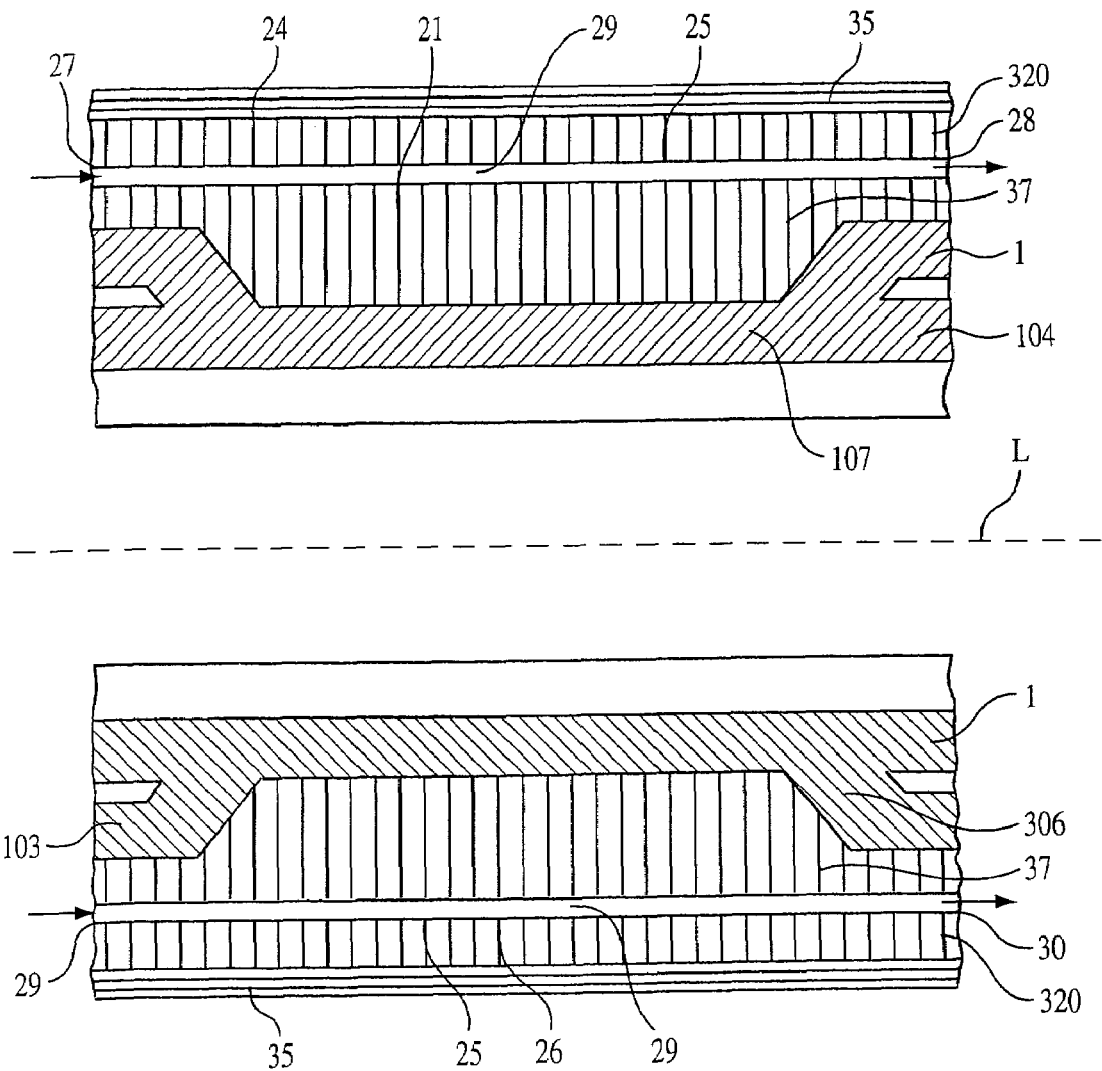
FIG. 4 is side cross-sectional view of an alternative embodiment of a stator cooling system.

Referring to FIG. 4, in another embodiment, a cooled stator system 200 includes a stator 1, as shown in FIG. 1, encased by a thermally conducting material 24. Thermally conducting materials 27 and 37 are formed by laminating a series of plates 21 around the midsection 107 of the stator 1. The phase coils 8, 9, 10, 11, 12 and 13 are assembled around bore tube 162 such that they are contacting each other at the bore tube surface. However, coil sides are separated from each other at the outer surface of coil assembly 7. This space is filled with wedge shape sections 37 (here, aluminum) of plates 21 as shown in FIG. 6. The aluminum wedge shape sections 37 help to remove heat from coil sides 7. In certain applications, aluminum wedge shape sections 37 are manufactured in the form of laminations to reduce eddy-current losses. These laminations also have holes 25 which are used for passing fresh water for cooling. It is further possible to install these wedge shape sections on each phase coil (8 through 13), epoxy impregnate the phase coil assembly and test it electrically and thermally before incorporating it into the stator assembly. When all phase assemblies are assembled, stator coil assemblies with cooling wedge shape sections form the assembly 12 shown in FIG. 5.

Plates 21 are made from a thermally conducting material. Examples of thermally conducting materials include metals, e.g., copper, iron and aluminum, as well as flexible graphite materials, such as Grafoil®, a product of UCAR International Inc., Nashville, Tenn. Grafoil® advantageously has a thermal conductivity similar to that of copper while having an electrical resistivity characteristic approximately 100 times that of copper. Typically, the plates are formed from a non-magnetic material, e.g., copper or aluminum. Each plate 21 includes a body portion 320 and the wedge shaped section 37 which extends radially towards the central axis of the stator. Typically, plates 21 are aligned between ends 103, 104 of the stator such that a passage 25 from each plate forms an outer bore 29 for fitting a cooling tube. Outer bore 29 is parallel to the central axis (L) and provides a path for the flow of fresh water. Each plate 21 also can be insulated from adjacent plates to reduce eddy currents, which cause increased heating.

Figure 5:
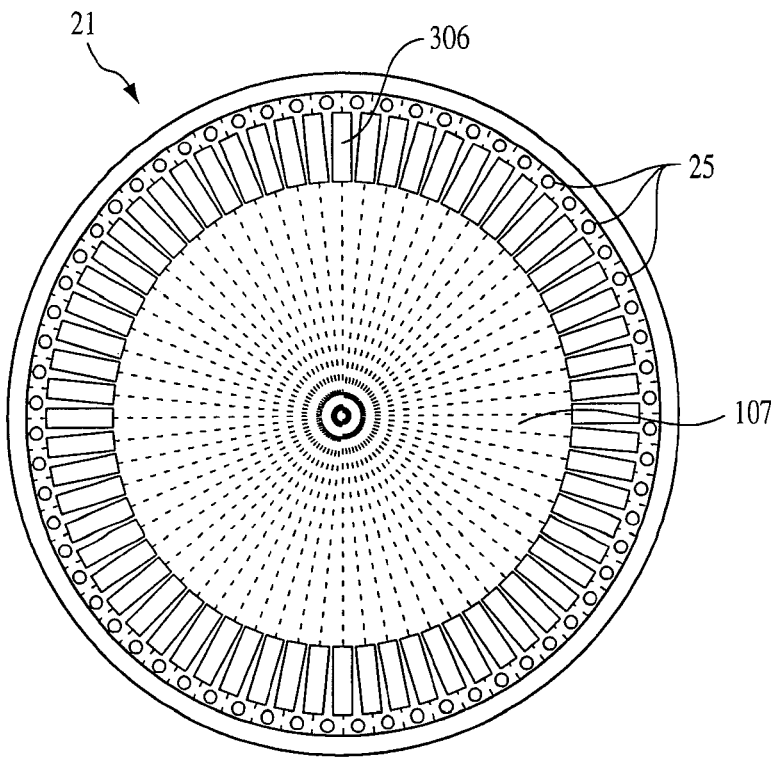
FIG. 5 is a end on cross-sectional view of the cooling system along the plan A-A of FIG. 4.
Figure 6:
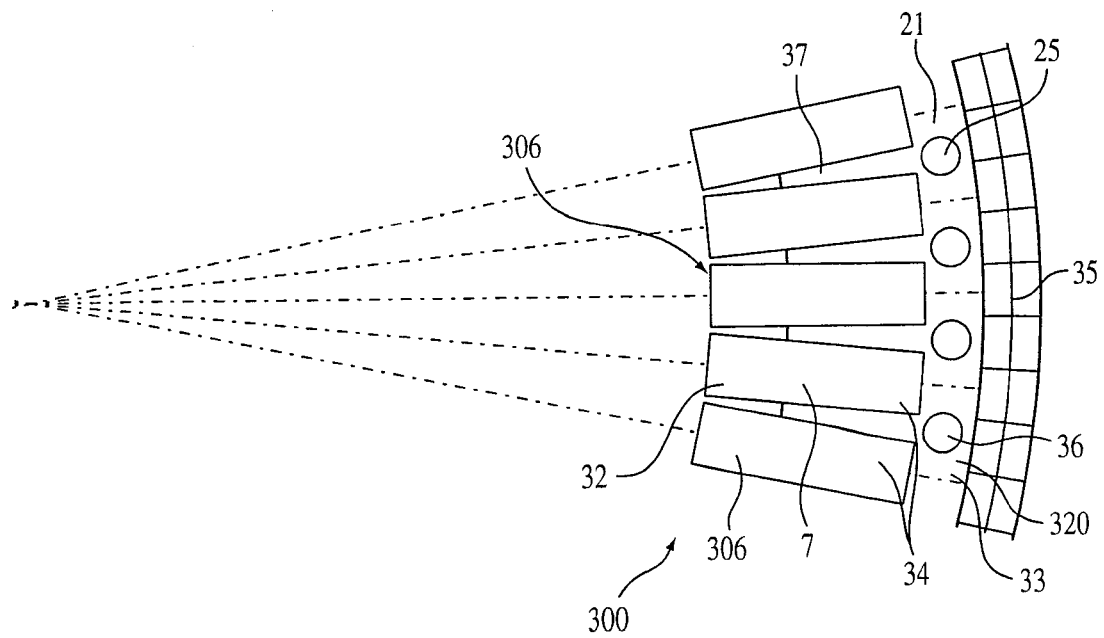
FIG. 6 is an enlarged view about portion A of the cooling system of FIG. 5.

FIG. 5 shows a top view of plate 21 including the coils 306 of stator 1, body 320, and tooth portions 37. Each plate can include passages 25, equally spaced and radially positioned about the circumference of a stator midsection 107. For example, each plate 21 can include a passage for each winding of the stator. As shown in greater detail in FIG. 6, coil 306 includes adjacent windings 6, 7 having inner ends 32 and outer ends 34. Tooth portion 37 is wedged between adjacent windings so that the windings touch at inner ends 32, i.e., on the bore side, and are spaced apart on outer ends 34. Inner body 37 provides additional surface area for the transfer of heat between the windings and the coolant manifold.

Alternate embodiments may redirect fluid from one passage to another to form a serial fluid flow loop. For example in FIG. 6, passage 25 may be connected to passage 36 so that fluid from passage 25 goes through passage 36 before it leaves the cooling system. Other embodiments may cool warm water from the cooling system by running it through a heat exchanger before pumping it through the system again. Alternatively, water to the cooling system could come from a main water supply and could be discarded after use.

In still other embodiments, the stator winding assembly is cooled using a stator cooling system having a form similar to the stator winding itself.

Figure 7:
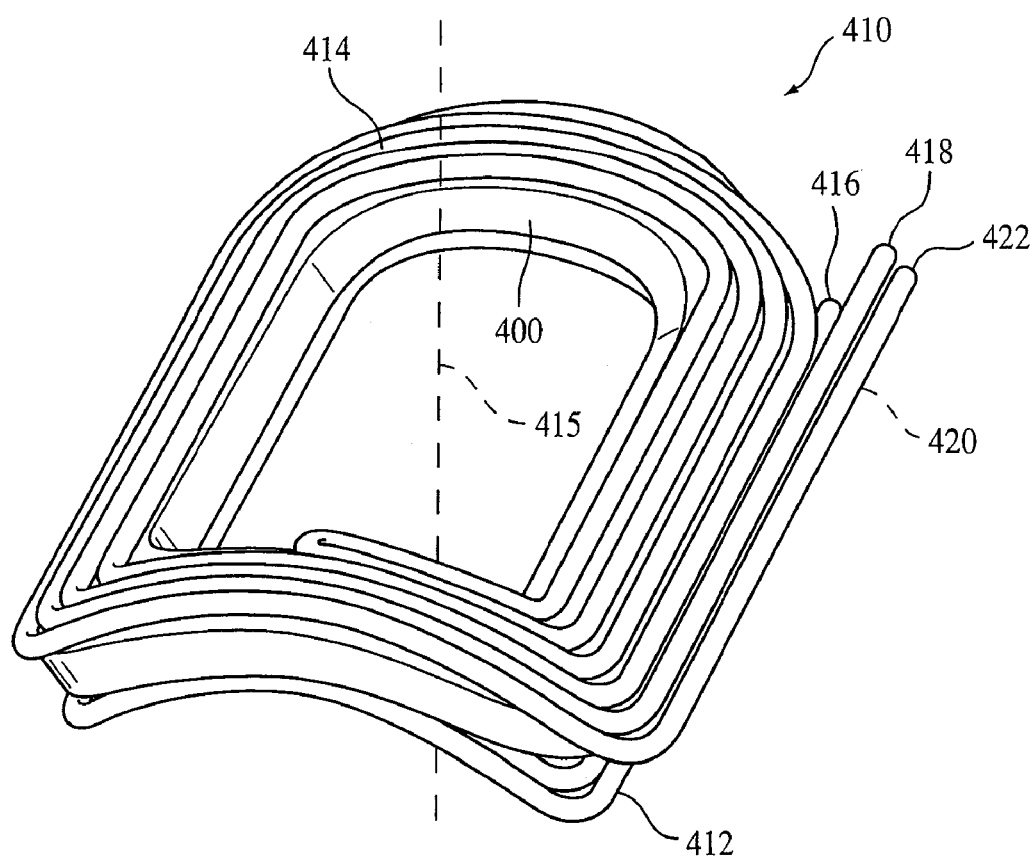
FIG. 7 is a perspective view of an alternate embodiment of a stator cooling system for a coil winding.
Figure 8:
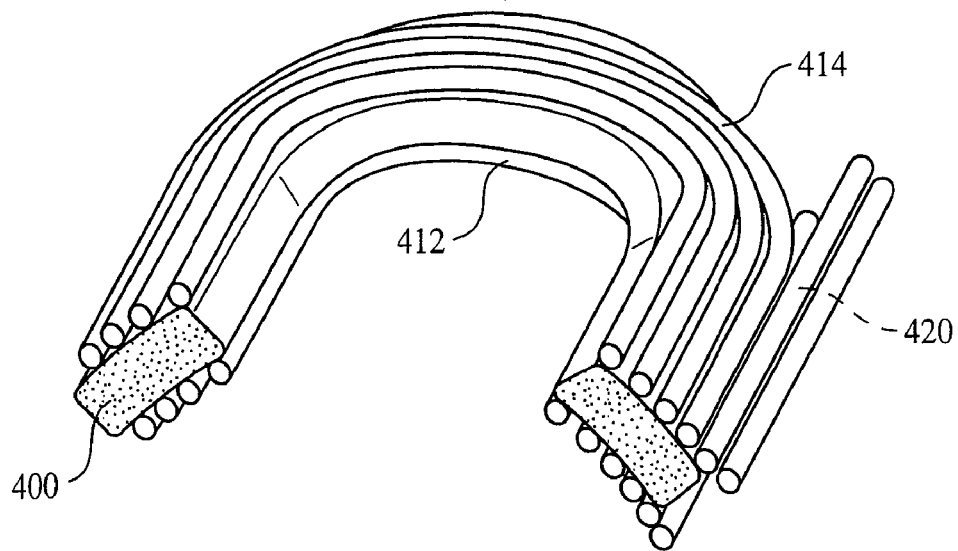
FIG. 8 is a cross-sectional perspective view of the stator cooling system of FIG. 7.
Figure 9:
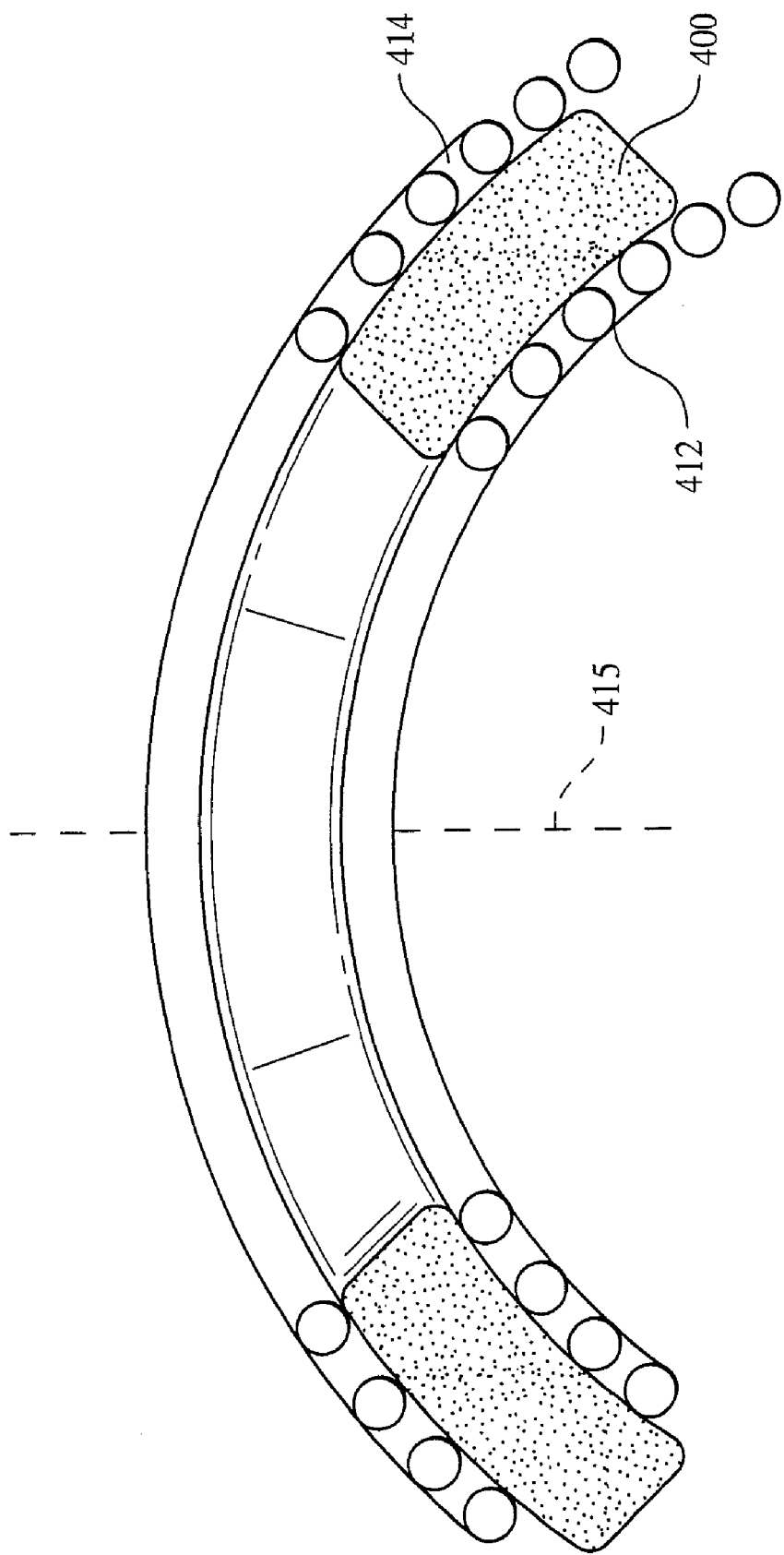
FIG. 9 is an end view of the stator cooling system of FIG. 7.

Referring to FIGS. 7-9, for example, a stator winding 400 of the type similar to phase coil assemblies 11, 12, and 13 of three phase stator 1 (see FIG. 1) is shown independent from its neighboring phase coil assemblies. In this embodiment, a cooling system 410 includes a pair of cooling tubes 412, 414 concentrically wound about an axis 415 of stator winding 400 and positioned on opposing sides of stator winding 400. Note that axis 415 is transverse to axis L of the embodiment of the cooled stator system 200 shown in FIG. 3. In particular, cooling tubes 412 are positioned to be in thermal contact with the inner surface and outer surface of stator winding 400, respectively.

As was the case with the cooling tubes described above, cooling tubes 412, 414 are formed of a non-magnetic material, such as aluminum or stainless steel. In many applications, stainless steel is preferable because of its resistance to corrosion and low eddy current loss characteristics.

Unlike the embodiments described above in conjunction with FIGS. 1-6, cooling tubes 412, 414 are concentrically wound into a saddle-shaped, racetrack form, similar to that of stator winding 400. As shown in FIG. 8, the cooling tubes are wound to conform to the generally curved surface of the stator winding and are wound in bifilar fashion.

By "bifilar", it is meant that two lengths of each cooling tube are wound together, in parallel, one over the other (wound in-hand) so that each cooling tube 412, 414 has a helical arrangement with an inlet 416, 418 and outlet 420, 422 extending from the outer periphery of respective ones of the cooling tubes. Winding the cooling tubes using the bifilar approach advantageously allows the inlet and outlet to be positioned adjacent each other without requiring a length of the tube extending back over the wound cooling tube. Moreover, the cooling tubes themselves form a coil which links magnetic flux from the stator field winding, which it cools. The bifilar winding approach reduces voltage and circulating currents flowing through the cooling tube, thereby reducing eddy current losses.

In one approach for winding cooling tubes 412, 414 in a bifilar manner, a length of the cooling tube is folded upon itself at its midpoint to form a U-shaped bend 424 (FIG. 7). The length of folded cooling tube is then concentrically wound outwardly, one turn over the other.

With respect to a multi-phase stator having multiple stator windings (e.g., the three-phase stator assembly of FIG. 1), cooling tubes 412, 414 of cooling system 410 are individually potted to each of the stator windings thereby providing a separate and independently testable subsystem.

Figure 10:
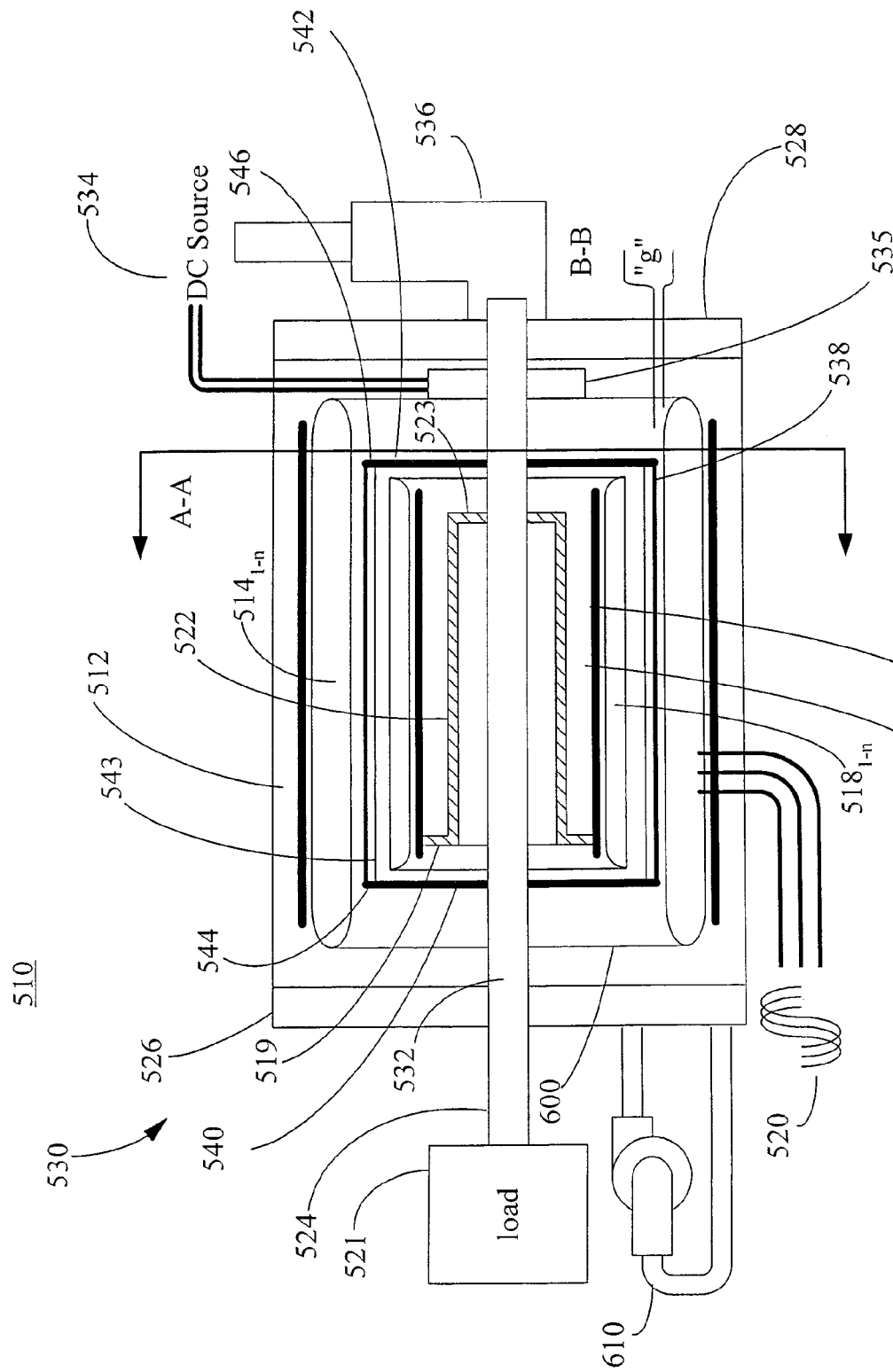
FIG. 10 is a cross-sectional side view of a superconducting rotating machine.

Referring to FIG. 10, a superconducting rotating machine 510 has a stator assembly 512 including stator coil assemblies $514_{1-n}$. As is well known in the art, the specific number of stator coil assemblies $514_{1-n}$ included within stator assembly 512 varies depending on various design criteria, such as whether the machine is a single phase or a polyphase machine. For example, in one 33,000 horsepower superconducting machine design, stator assembly 512 includes one hundred and eighty stator coil assemblies $514_{1-n}$. These stator coil assemblies $514_{1-n}$ are mounted on a stator coil support structure that is constructed of a non-magnetic, thermally-conductive material, thus minimizing Eddy current heating and the resulting stator inefficiencies. This will be discussed in greater detail below.

A rotor assembly 516 rotates within stator assembly 512. As with stator assembly 512, rotor assembly 516 includes rotor winding assemblies $518_{1-n}$. In the same 33,000 horsepower superconducting machine design, rotor assembly 516 includes twelve rotor winding assemblies $518_{1-n}$. These rotor winding assemblies, during operation, generate a magnetic flux that links rotor assembly 516 and stator assembly 512.

During operation of superconducting rotating machine 510, a supply voltage 520 is supplied to stator coil assemblies $514_{1-n}$. By supplying supply voltage 520, machine 510 is brought up to its operating speed, which is proportional to the frequency of supply voltage 520. Accordingly, if the frequency of supply voltage 520 is held constant, machine 510 (i.e., rotor assembly 516) will rotate at a constant (or synchronous) speed. The torque generated by this now-rotating rotor assembly 516 is transferred to a load 521 (e.g., a propeller shaft of a ship, a conveyor belt on a production line, the drive wheels of a diesel locomotive, etc.). The rotor winding assemblies $518_{1-n}$ are mounted on a support structure 517 which is connected to a first flange 519 that transfers the motor torque to a torque tube 522. Torque tube 522 is connected to a second flange 523, which is connected to an output shaft 524. Flanges 519 and 523 may be incorporated into torque tube 522 or may be separate assemblies.

Output shaft 524 is supported by a pair of bearing plates 526, 528, one at each end of rotor assembly 516. The bearing plate 526 on the drive end 530 of superconducting rotating machine 510 contains a passage 532 through which output shaft 524 passes. Additionally, bearing plate 528 may also have a passage through which the output shaft 524 passes. Bearing plates 526, 528 position rotor assembly 516 at the proper position within stator assembly 512 so that rotor assembly 516 can freely rotate within stator assembly 512 while maintaining the proper gap "g" between rotor assembly 516 and stator assembly 512.

During operation of superconducting rotating machine 510, field energy 534 is applied to rotor winding assembly $518_{1-n}$ through a slip ring/rotating disk assembly 535. This signal can be in the form of a DC current. Rotor winding assemblies $518_{1-n}$ require DC current to generate the magnetic field (and the magnetic flux) required to link the rotor assembly 516 and stator assembly 512. Therefore, if field energy 534 is supplied in the form of an AC current, a rectifier/thyristor circuit (not shown) will be employed to convert the AC current into a DC current.

While stator coil assemblies $514_{1-n}$ are non-superconducting copper coil assemblies, rotor winding assemblies $518_{1-n}$ are superconducting assemblies incorporating either HTS (High Temperature Superconductor) or LTS (Low Temperature Superconductor) windings. Examples of LTS conductors are: niobium-zirconium; niobium-titanium; and niobium-tin. Examples of HTS conductors are: thallium-barium-calcium-copper-oxide; bismuth-strontium-calcium-copper-oxide; mercury-barium-calcium-copper-oxide; and yttrium-barium-copper-oxide.

As these superconducting conductors only achieve their superconducting characteristics when operating at low temperatures, superconducting machine 510 includes a refrigeration system 36. Refrigeration system 36 is typically in the form of a cryogenic cooler that maintains the operating temperature of rotor winding assemblies $518_{1-n}$ at an operating temperature sufficiently low to enable the conductors to exhibit their superconducting characteristics.

Rotor assembly 516 includes an asynchronous field filtering shield 538 positioned between stator assembly 512 and rotor assembly 516. As rotor assembly 516 is typically cylindrical in shape, asynchronous field filtering shield 538 is also typically cylindrical in shape. Stator assembly 512 is typically powered by multiphase AC power or pulse-width modulated (PWM) power 520 at a frequency commensurate with the desired shaft speed. This, in turn, generates a rotating magnetic field that rotates about the axis of the cylindrically-shaped stator assembly 512. As stated above, the frequency of the multiphase AC power 520 supplied to stator assembly 512 proportionally controls the rotational speed of superconducting machine 510. Since AC or PWM signals naturally contain harmonics of their primary frequency (e.g., odd multiples of a 60 Hertz signal), it is desirable to shield the rotor winding assemblies $518_{1-n}$ of rotor assembly 516 from these asynchronous fields. Accordingly, asynchronous field filtering shield 538, which is fitted to rotor assembly 516, electromagnetically shields rotor winding assemblies $518_{1-n}$ from the asynchronous fields generated as a result of these harmonics present in three-phase AC power 520. Asynchronous field filtering shield 538 is constructed of a non-magnetic material (e.g., copper, aluminum, etc.) and should be of a length sufficient to fully cover and shield rotor winding assemblies $518_{1-n}$. In a preferred embodiment, asynchronous field filtering shield 538 is constructed of 6061T6 structural aluminum. The thickness of shield 538 varies inversely with respect to the frequency of the three-phase AC power 520 supplied to stator assembly 512, which is typically in the range of 2-120 Hertz. Typically, the thickness of shield 538 varies from ½-3 inches depending on this supply frequency.

Shield 538 is connected to output shaft 524 via a pair of end plates 540, 542. These end plates 540, 542 are rigidly connected to output shaft 524. This rigid connection can be in the form of a weld or a mechanical fastener system (e.g., bolts, rivets, splines, keyways, etc.).

A vacuum chamber sleeve 543 surrounds the rotor winding assemblies $518_{1-n}$. This vacuum chamber sleeve 543 is positioned between shield 538 and the rotor winding assemblies $518_{1-n}$ and is connected on its distal ends to end plate 540, 542. This connection can be in the form of a weld, a braze, or a mechanical fastener system (e.g., bolts, rivets, splines, keyways, etc.). Typically, vacuum chamber sleeve 543 is relatively thin (e.g., ³⁄₁₆″) and is constructed of stainless steel. When vacuum chamber sleeve 543 is connected to the end plates, an air-tight chamber is formed which encloses the rotor winding assemblies $518_{1-n}$. This air-tight chamber can then be evacuated, thus forming a vacuum within the chamber. This helps to insulate the rotor winding assemblies $518_{1-n}$ (which are superconducting and kept cool) from output shaft 524 (which is warm).

As stated above, a gap "g" exists between stator assembly 512 and rotor assembly 516. In order to reduce the size of superconducting rotating machine 510, it is desirable to reduce the dimensions of this gap (or spacing) to a minimum allowable value. In the same 33,000 horsepower superconducting machine, this gap "g" has a value of just over one inch. Specifically, due to the maximization of the flux linkage, the efficiency of machine 510 is maximized when gap "g" is minimized. Unfortunately, when gap "g" is minimized, shield 538 gets very close to the windings of stator coil assembly $514_{1-n}$.

During operation of superconducting rotating machine 510, shield 538 will heat up as a result of eddy current heating caused by the presence of the asynchronous fields described above. As metals (especially aluminum) are known to expand when heated, it is important that rotor assembly 516 be capable of accommodating this expansion. This expansion can occur in two dimensions, both axially (i.e., along the direction of the output shaft 524) and radially (i.e., along the direction of the rotor assembly's radius). Accordingly, rotor assembly 516 typically includes a pair of interconnection assemblies 544, 546 for connecting shield 538 to end plates 540, 542. These interconnections assemblies 544, 546 compensate for the thermal expansion of shield 538 by allowing for axial movement between shield 538 and end plates 540, 542 while restricting tangential movement.

Figure 11:
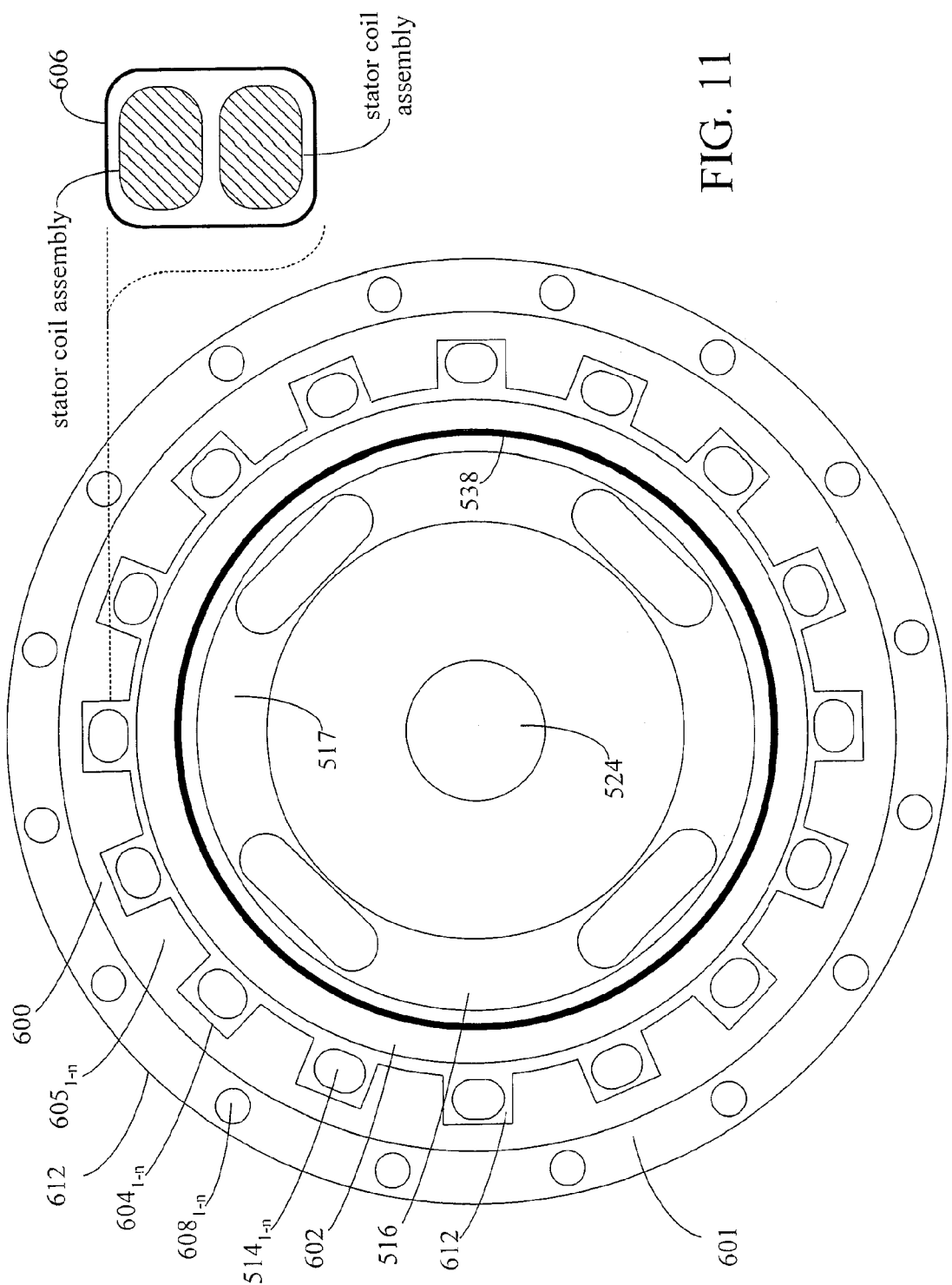
FIG. 11 is a cross-sectional end view of the stator assembly of the superconducting rotating machine of FIG. 10.

FIG. 11 shows the details of a particular embodiment of stator assembly 512. Referring to FIGS. 10 and 11, stator assembly 512 includes a stator coil support structure 600 for supporting and positioning the stator coil assemblies $514_{1-n}$. In traditional, non-superconducting machines (e.g., induction motors), stator coil support structure 600 is constructed of a magnetic material (e.g., laminated sheet steel). By using a magnetic material, the non-superconducting machine will magnetically saturate the stator coil support structure, resulting in an increased flux density and, therefore, an increased flux linkage between the stator and rotor assemblies.

As is well known in the art, a superconducting rotating machine 510 achieves its desirable superconducting characteristics by maximizing efficiencies, minimizing heat build-up within the machine 510, and maintaining the superconducting rotor winding assemblies $518_{1-n}$ at an operating temperature sufficiently low to enable the conductors to exhibit their 10 superconducting characteristics. The low resistivity of the superconducting rotor winding assemblies $518_{1-n}$ allows for high levels of flux density and, therefore, high levels of flux linkage between the stator assembly 512 and the rotor assembly 516. Accordingly, enhancing the flux density through the use of a magnetically-saturatable stator coil support structure is not required.

Further, it is undesirable to use a magnetically-saturatable stator coil support structure, as this results in the generation of hysteresis and eddy current losses, thus lowering the efficiency of the superconducting rotating machine 510 by heating the stator coil assembly. Accordingly, stator coil support structure 600 is constructed of a non-magnetic thermally-conductive material, such as: a polymer-based adhesive (e.g., Advanced Thermal Transfer Adhesive, available from the BTech Corporation, 120 Jones parkway, Brentwood, Tenn. 37027); or a graphite-based material (e.g., Grafoil, available from Union Carbide, 39 Old Ridgebury Road, Danbury, Conn. 06817). These materials have a favorable thermal transfer coefficient of at least 100 Watt/Meter Kelvin. Specifically, Advanced Thermal Transfer Adhesive has a thermal transfer coefficient of between 100 and 450 Watt/Meter Kelvin and Grafoil has a thermal transfer coefficient of between 140 and 375 Watt/Meter Kelvin. By comparison, glass epoxy material has a thermal transfer coefficient of ~0.60 Watt/Meter Kelvin.

By using a non-magnetic, thermally-conductive material, stator heating resulting from the presence of eddy currents is eliminated. Further, any heat generated by stator coil assemblies $514_{1-n}$ can be easily removed (this will be discussed below in greater detail). This non-magnetic thermally-conductive material can be in the form of a sheet material or a castable liquid. If the material is a castable liquid, it can be cast into the form of a cylindrical structure and then machined into it's final form. Alternatively, if the material is a sheet material, it can be laminated into the required shape.

Stator coil support structure 600 includes an axial passage 602 for receiving rotor assembly 516. Channels $604_{1-n}$ are positioned radially about the stator coil support structure 600, thus forming teeth $605_{1-n}$ that act as heat sinking members and absorb the thermal energy generated by the stator coil assemblies $514_{1-n}$. These channels are designed and sized to each receive one or more of the stator coil assemblies $514_{1-n}$. It is important to appreciate that while sixteen channels are shown, this is for illustrative purposes only and is not intended to be a limitation of the invention, as the specific number of channels $604_{1-n}$ (and, therefore, stator coil assemblies $514_{1-n}$) utilized will vary depending on the design requirements of the superconducting rotating machine 510. In the same 33,000 horsepower superconducting machine design, stator coil support structure 600 includes ninety channels $604_{1-n}$, each of which includes two stator coil assemblies $514_{1-n}$ (stacked on top of each other). Further, while channels $604_{1-n}$ are shown being positioned about the inner perimeter of stator coil support structure 600, this is for illustrative purposes only, as these channels $604_{1-n}$ can be positioned about the outer perimeter of structure 600. Each stator coil assembly $514_{1-n}$ is surrounded by a ground plane 606, such as a wire wound around the circumference of the stator coil assembly $514_{1-n}$ and tied to ground.

Stator coil support structure 600 is typically surrounded by an outer annular assembly 501. This assembly 601, which is typically constructed of laminated sheet steel, is commonly referred to as the "back iron" and provides a flux return path for rotor assembly 516.

Assembly 601 includes coolant passages $508_{1-n}$ which are bored axially through assembly 101. These coolant passages $608_{1-n}$ allow a coolant (e.g., water, oil, air, or a suitable gas) to be circulated through assembly 601 by coolant circulation system 610. As assembly 601 is in thermal contact with stator coil support structure 600, due to conductive heat transfer, thermal energy is transferred from stator coil support structure 600 to assembly 601. Convective heat transfer then transfers thermal energy to the coolant circulating through the coolant passages $608_{1-n}$.

Since air is a relatively poor conductor of heat, an epoxy filler 612 (e.g., a low viscosity liquid resin) is utilized to fill any voids between stator coil assemblies $514_{1-n}$ and channels $604_{1-n}$. This epoxy filler 612 can be either drawn into these voids through the use of a vacuum or pushed into the voids using positive pressure.

Figure 12:
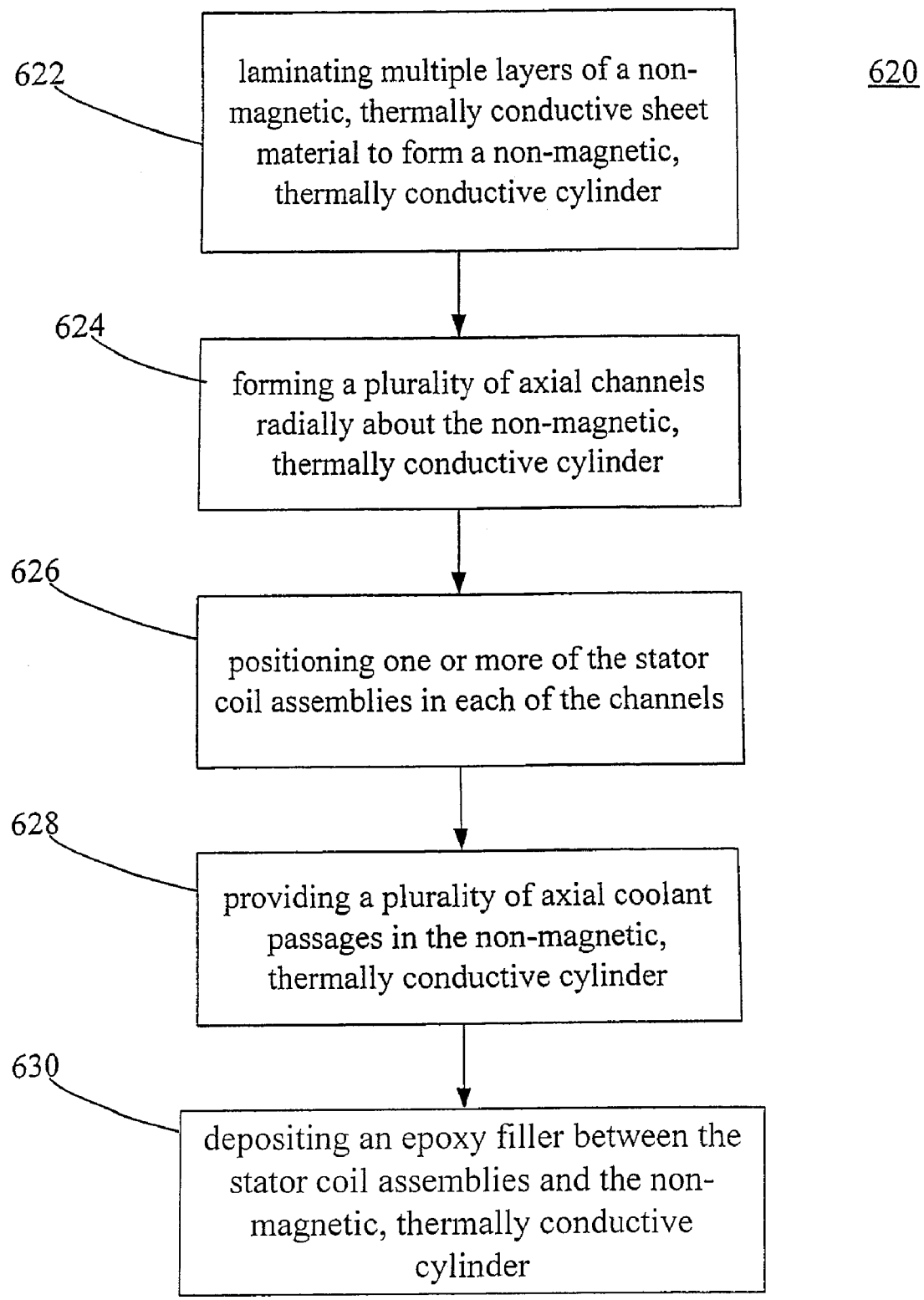
FIG. 12 is a flow chart of a method of manufacturing a stator coil support structure.

Referring to FIG. 12, there is shown a method 620 of manufacturing a stator coil support structure. This method is utilized when the stator coil support structure is constructed of a sheet material and the "teeth" which separate the stator coil assemblies are an integral part of the stator coil support structure.

Method 620 includes laminating 622 multiple layers of a non-magnetic, thermally conductive sheet material to form a non-magnetic, thermally conductive cylindrical structure. Method 620 includes providing 624 a plurality of axial channels radially about the non-magnetic, thermally conductive cylindrical structure. Method 620 includes positioning 626 one or more of the stator coil assemblies in each of the channels. Method 620 further includes providing 628 axial coolant passages in the non-magnetic, thermally conductive cylindrical structure and depositing an epoxy filler 630 between the stator coil assemblies and the non-magnetic, thermally conductive cylindrical structure.

Figure 13:
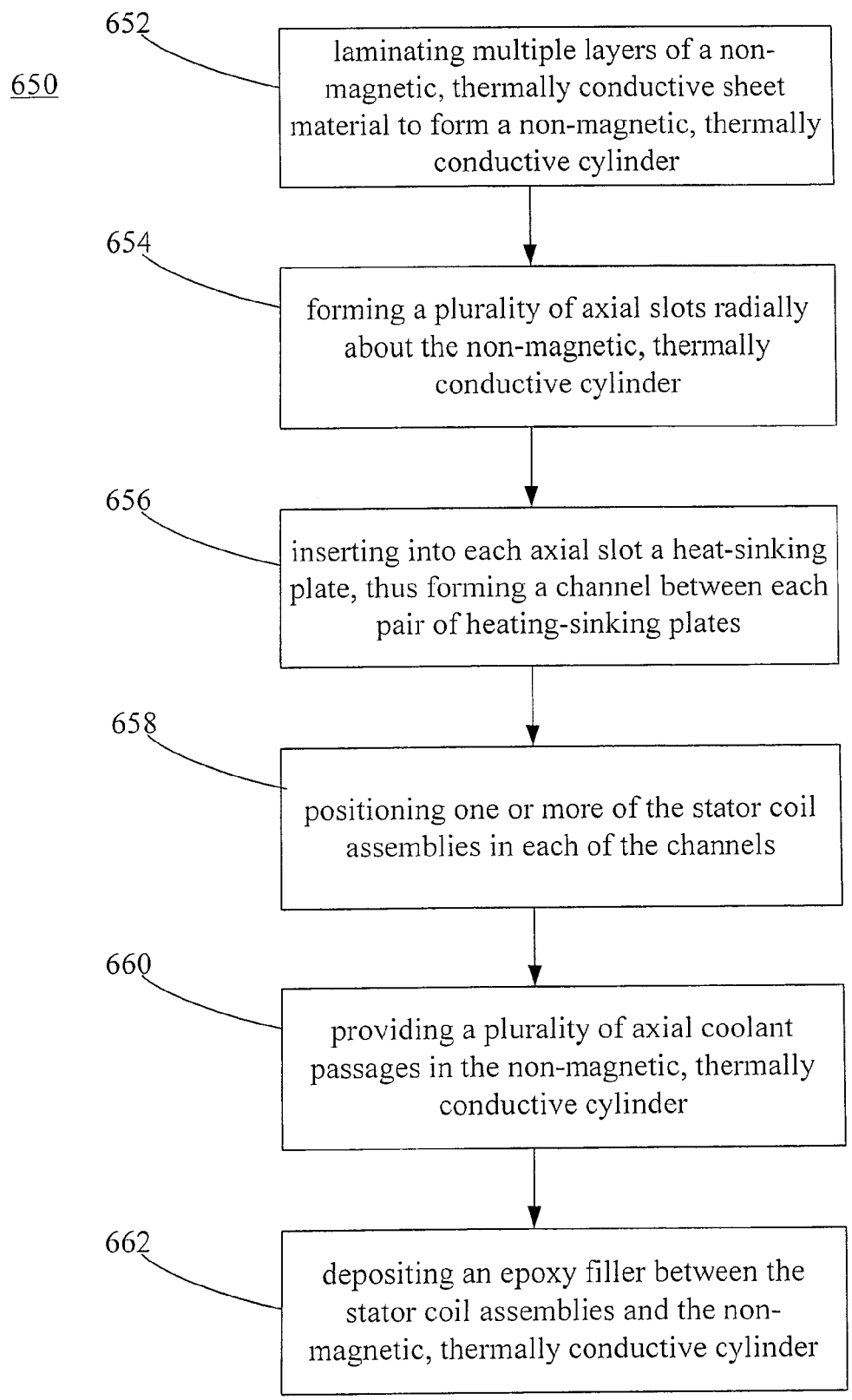
FIG. 13 is a flow chart of another method of manufacturing a stator coil support structure.

Referring to FIG. 13, there is shown a method 650 of manufacturing a stator coil support structure. This method is utilized when the stator coil support structure is constructed of a sheet material and the "teeth" which separate the stator coil assemblies are inserted into slots machined into the stator coil support structure.

Method 650 includes laminating 652 multiple layers of a non-magnetic, thermally conductive sheet material to form a non-magnetic, thermally conductive cylindrical structure, Method 650 includes forming 654 a plurality of axial slots radially about the non-magnetic, thermally conductive cylindrical structure and inserting 656 into each axial slot a heat-sinking member, thus forming a channel between each pair of heating-sinking members. Method 650 includes positioning 658 one or more of the stator coil assemblies in each of the channels. Method 650 further includes providing 660 a plurality of axial coolant passages in the non-magnetic, thermally conductive cylindrical structure and depositing 662 an epoxy filler between the stator coil assemblies and the non-magnetic, thermally conductive cylindrical structure.

Figure 14:
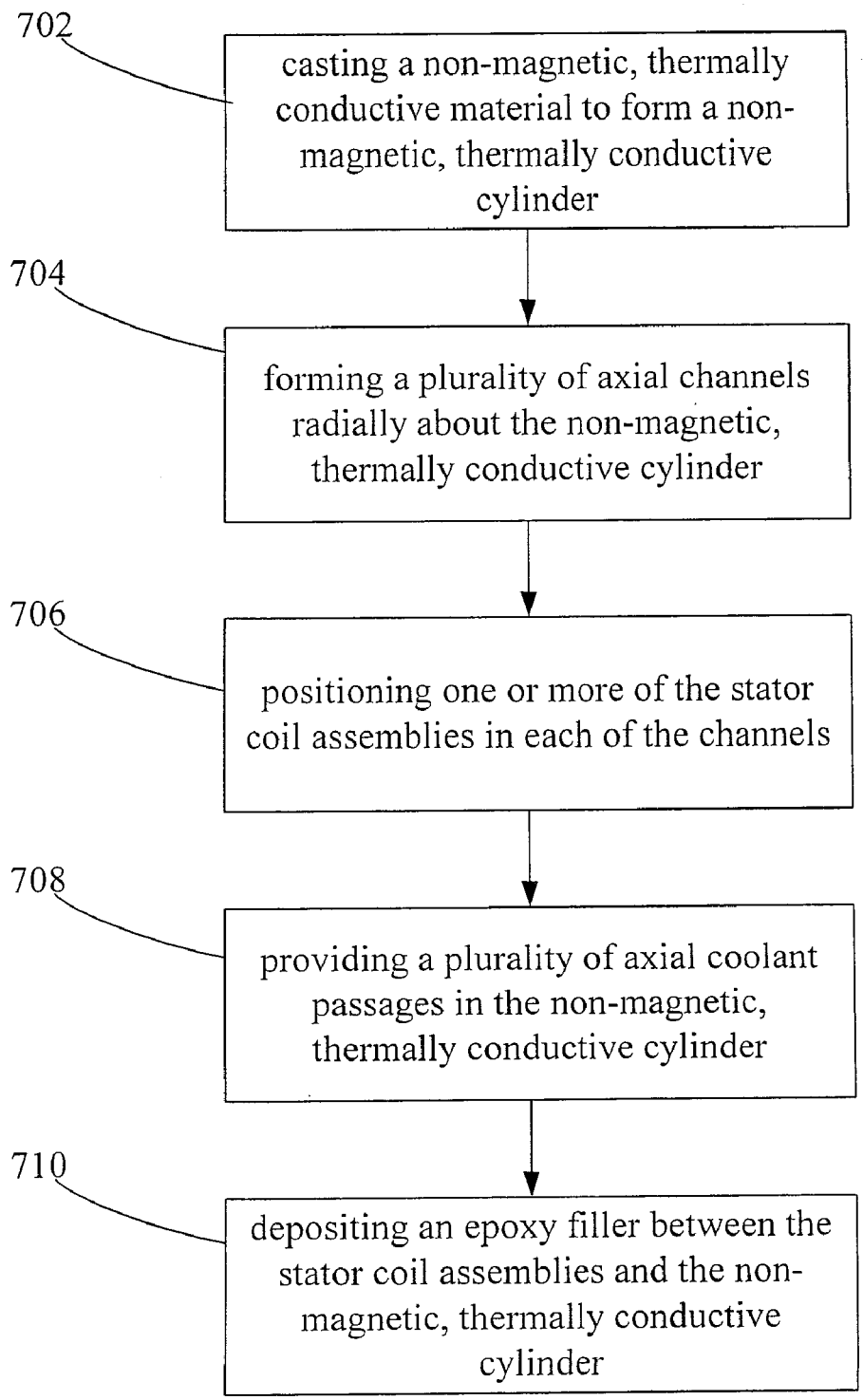
FIG. 14 is a flow chart of another method of manufacturing a stator coil support structure.

Referring to FIG. 14, there is shown a method 700 of manufacturing a stator coil support structure. This method is utilized when the stator coil support structure is constructed of a cast material and the "teeth" which separate the stator coil assemblies are an integral part of the stator coil support structure.

Method 700 includes casting 702 a non-magnetic, thermally conductive material to form a non-magnetic, thermally conductive cylindrical structure. Method 700 includes forming 704 a plurality of axial channels radially about the non-magnetic, thermally conductive cylindrical structure, and positioning 706 one or more of the stator coil assemblies in each of the channels. Method 700 further includes providing 708 a plurality of axial coolant passages in the non-magnetic, thermally conductive cylindrical structure, and depositing 710 an epoxy filler between the stator coil assemblies and the non-magnetic, thermally conductive cylindrical structure.

Figure 15:
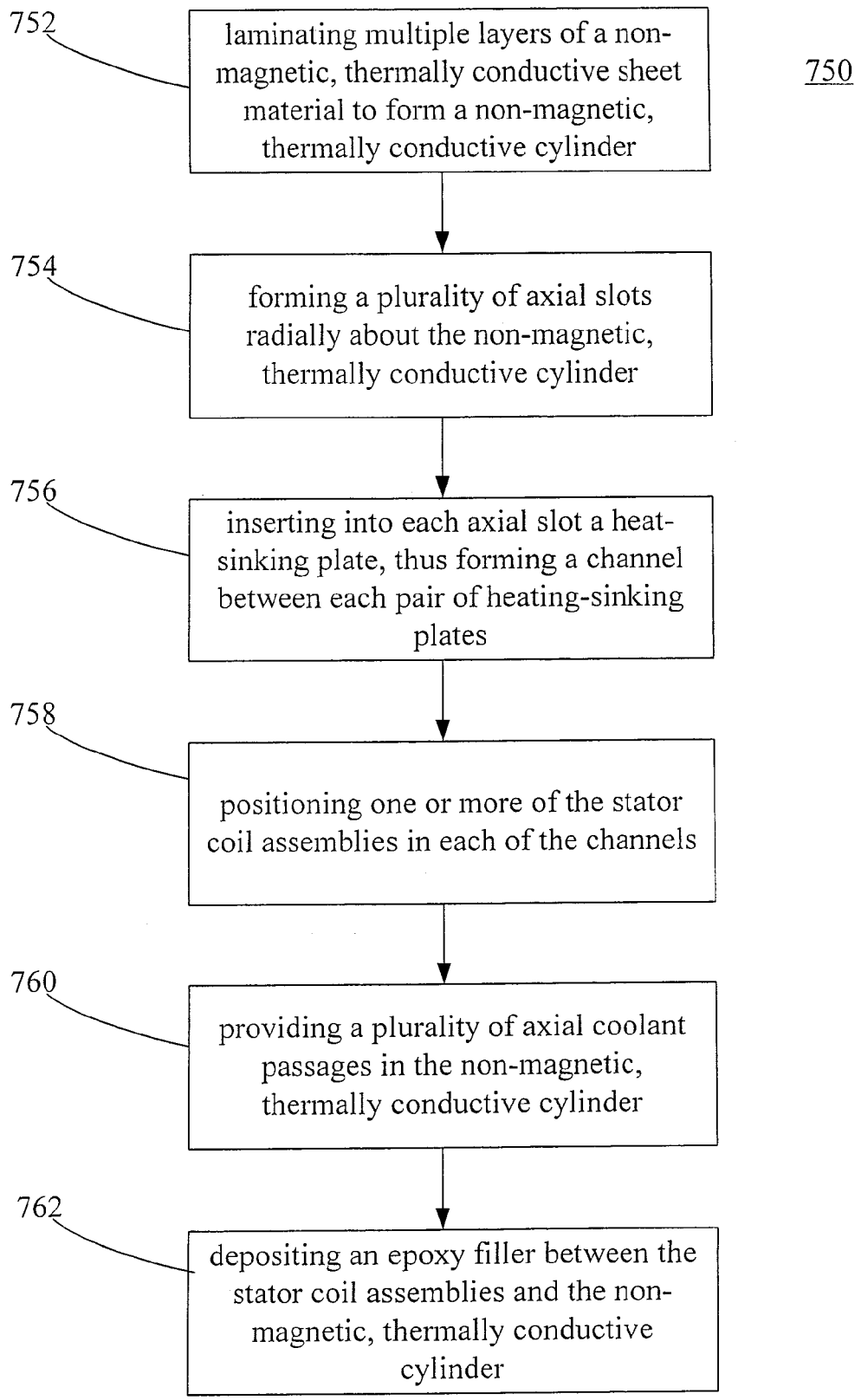
FIG. 15 is a flow chart of another method of manufacturing a stator coil support structure.

Referring to FIG. 15, there is shown a method 750 of manufacturing a stator coil support structure. This method is utilized when the stator coil support structure is constructed of a cast material and the "teeth" which separate the stator coil assemblies are inserted into slots machined into the stator coil support structure.

Method 750 includes laminating 752 multiple layers of a non-magnetic, thermally conductive sheet material to form a non-magnetic, thermally conductive cylindrical and forming 754 a plurality of axial slots radially about the non-magnetic, thermally conductive cylindrical structure. Method 750 includes inserting 756 into each axial slot a heat-sinking member, thus forming a channel between each pair of heating-sinking plates. Method 750 includes positioning 758 one or more of the stator coil assemblies in each of the channels. Method 750 further includes providing 760 a plurality of axial coolant passages in the non-magnetic, thermally conductive cylindrical structure and depositing 762 an epoxy filler between the stator coil assemblies and the non-magnetic, thermally conductive cylindrical structure.

Figure 16:
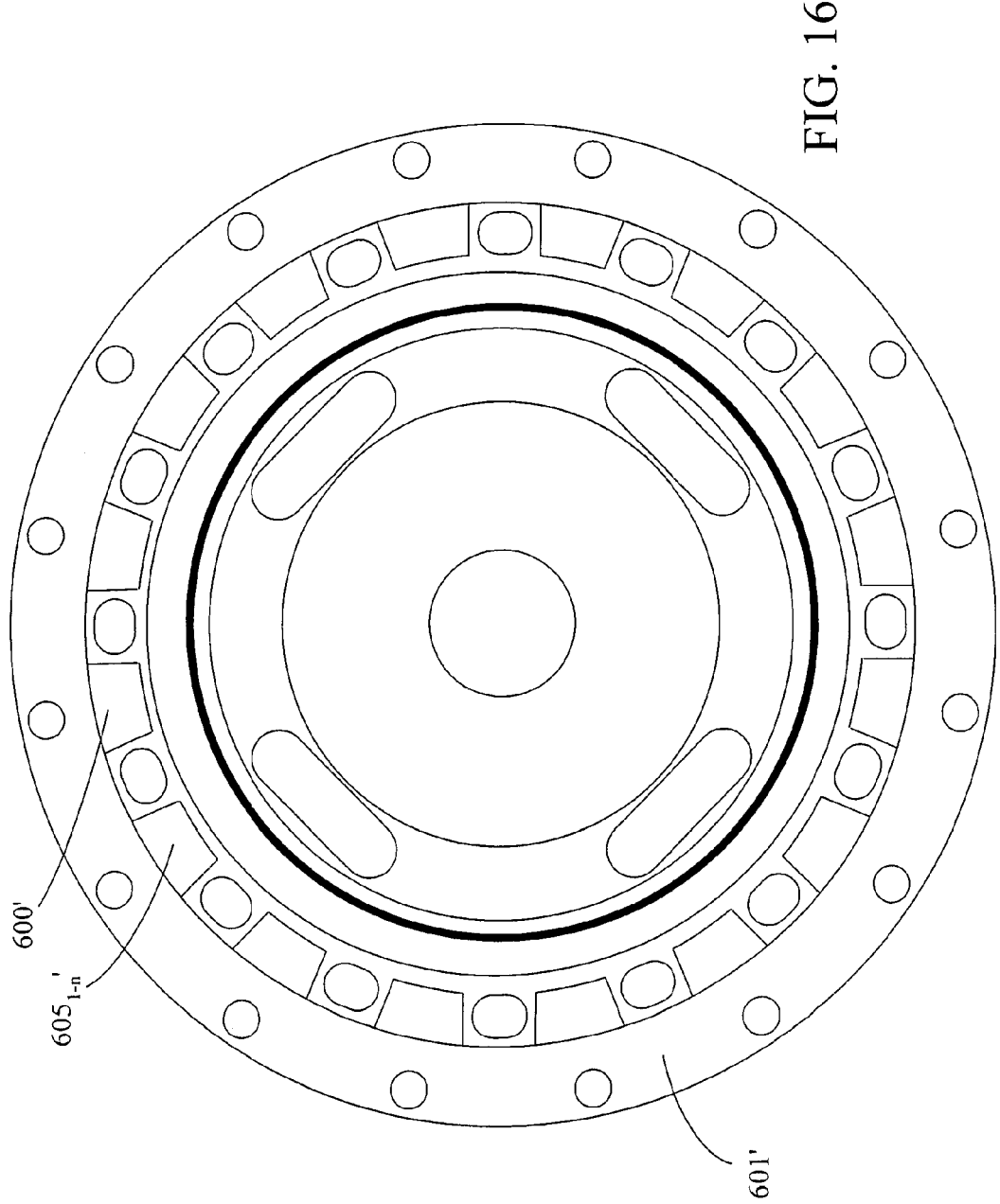
FIG. 16 is a cross-sectional end view of another embodiment of the stator assembly of the superconducting rotating machine of FIG. 10.

Now referring to FIGS. 10 and 16, it is shown that the stator coil support structure 100' may actually consist of only non-magnetic thermally-conductive teeth $605_{1-n}'$. For example, an outer annular assembly 601' (which is typically constructed of laminated sheet steel and is, therefore, magnetic) can be used to radially position non-magnetic thermally-conductive teeth $605_{1-n}'$ around the perimeter of assembly 601' Therefore, the "back iron" (i.e., outer annular assembly 601) is used to support and position the stator coil support structure 601, which actually consists of multiple non-magnetic thermally-conductive teeth $605_{1-n}'$. Since the teeth $605_{1-n}'$ between adjacent stator coils are constructed of a non-magnetic thermally conductive material, magnetic saturation is eliminated. Further, by placing these non-magnetic, thermally conductive teeth $605_{1-n}'$ in thermal contact with assembly 601', thermal energy is easily transferred from teeth $605_{1-n}'$ to assembly 601'.

Figure 17:
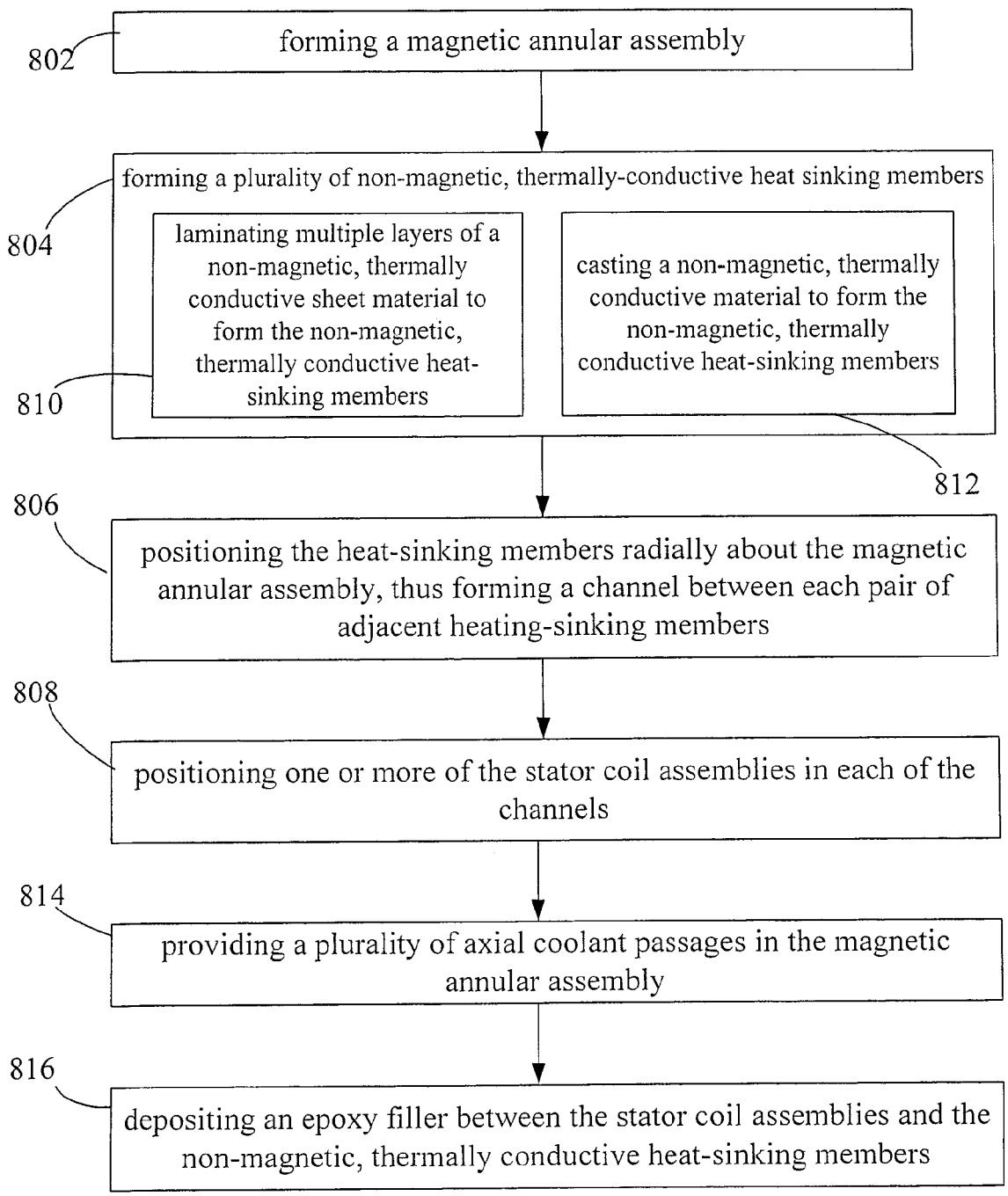
FIG. 17 is a flow chart of another method of manufacturing a stator coil support structure.

Referring to FIG. 17, there is shown a method 800 of manufacturing a stator coil support structure. A magnetic annular assembly is formed 802 and a plurality of non-magnetic, thermally-conductive heat sinking members are formed 804. These heat-sinking members are positioned 806 radially about the magnetic annular assembly. This forms a channel between each pair of adjacent heating-sinking members. One or more of the stator coil assemblies are positioned 808 in each of the channels.

Forming 804 a plurality of non-magnetic, thermally conductive heat-sinking members includes laminating 810 multiple layers of a non-magnetic, thermally conductive sheet material, or casting 812 a non-magnetic, thermally conductive material, to form the non-magnetic, thermally conductive heat-sinking members. A plurality of axial coolant passages are provided 814 in the magnetic annular assembly and an epoxy filler is deposited 816 between the stator coil assemblies and the non-magnetic, thermally conductive heat-sinking members A number of embodiments of the invention have been described. Nevertheless, it will be understood that various modifications may be made without departing from the spirit and scope of the invention. Accordingly, other embodiments are within the scope of the following claims.

What is claimed is:

1. A stator support system for supporting a stator including a plurality of stator windings, the stator support system comprising:

a plurality of mechanical supports, each configured to be positioned between and contact adjacent ones of the plurality of stator windings, each mechanical support defining a corresponding cooling passage for receiving a cooling fluid, the corresponding cooling passage of at least one of the plurality of mechanical supports being formed entirely within the at least one of the plurality of mechanical supports, wherein each mechanical support includes a wedge-shaped section, the wedge-shaped sections extending radially towards a central axis of the stator, the wedge-shaped sections are in the form of laminations; and each lamination comprises graphite material.

2. The stator support system of claim 1, wherein each mechanical support is fabricated from a flexible graphite material.

3. The stator support system of claim 1, wherein each wedge-shaped section extends radially inward from a first end having a first width to a second end having a second width, the first width being less than the second width.

4. The stator support system of claim 1, wherein each mechanical support comprises a non-magnetic material.

5. The stator support system of claim 4, wherein each mechanical support comprises a thermally conductive material.

6. The stator support system of claim 1, wherein the cooling passage formed entirely within the at least one of the plurality of mechanical supports is round.

7. The stator support system of claim 1, wherein the respective cooling passages of the plurality of the mechanical supports are radially positioned about a circumference of the stator.

8. The stator support system of claim 1, wherein the respective cooling passages of the plurality of mechanical supports are equally spaced from corresponding cooling passages of adjacent mechanical supports.

9. The stator support system of claim 8, wherein each of the cooling passages positioned on any circumference of the stator is equally spaced from adjacent cooling passages on the circumference of the stator.

10. A stator support system for supporting a stator including a plurality of stator windings, the stator support system comprising:

a plurality of mechanical supports fabricated from a non-magnetic material, each mechanical support configured to be positioned between and contact adjacent ones of the plurality of stator windings, each mechanical support defining, at least in part, a cooling passage for receiving a cooling fluid, wherein each mechanical support includes a wedge-shaped section, the wedge-shaped sections extending radially towards a central axis of the stator, the wedge-shaped sections are in the form of laminations, and each lamination is fabricated from graphite material.

11. The stator support system of claim 10, wherein each mechanical support is fabricated from a flexible graphite material.

12. The stator support system of claim 10, wherein each wedge-shaped section extends radially inward from a first end having a first width to a second end having a second width, the first width being less than the second width.

13. The stator support system of claim 10, wherein each mechanical support is further fabricated from a thermally conductive material.

14. The stator support system of claim 10, wherein for at least one of the plurality of mechanical supports the corresponding cooling passage is formed entirely within the at least one of the plurality of mechanical supports.

15. The stator support system of claim 14, wherein the corresponding cooling passage for the at least one of the plurality of mechanical supports is round.

16. The stator support system of claim 10, wherein each corresponding cooling passage of each mechanical support is radially positioned about a circumference of the stator.

17. The stator support system of claim 10, wherein each corresponding cooling passage of each mechanical support is equally spaced from corresponding cooling passages of adjacent mechanical supports.

18. The stator support system of claim 17, wherein each of the cooling passages positioned on any circumference of the stator is equally spaced from adjacent cooling passages on the circumference of the stator.

* * * * *